United States Patent [19]

Yamamuro

[11] Patent Number: 5,445,446
[45] Date of Patent: Aug. 29, 1995

[54] FLUID PRESSURE CONTROL VALVE

[75] Inventor: Shigeaki Yamamuro, Atsugi, Japan

[73] Assignee: Unisia Jecs Corporation, Kanagawa, Japan

[21] Appl. No.: 122,959

[22] Filed: Sep. 20, 1993

[30] Foreign Application Priority Data

Sep. 21, 1992 [JP] Japan .................................. 4-251138
Oct. 19, 1992 [JP] Japan .................................. 4-279836

[51] Int. Cl.⁶ .............................................. B60T 8/40
[52] U.S. Cl. ............................. 303/117.1; 303/119.2
[58] Field of Search ............... 303/117.1, 119.2, 113.2, 303/116.1, 115.1, 115.2, 113.1; 251/129.09, 129.15; 137/596.16, 636

[56] References Cited

U.S. PATENT DOCUMENTS

| | | | |
|---|---|---|---|
| 3,286,734 | 11/1966 | Hartshorne | 303/117.1 X |
| 3,682,513 | 8/1972 | Oberthür | 303/117.1 |
| 5,018,797 | 5/1991 | Takata | 303/117.1 |
| 5,076,538 | 12/1991 | Mohr et al. | 303/119.2 X |

FOREIGN PATENT DOCUMENTS

| | | | |
|---|---|---|---|
| 3406794A1 | 9/1985 | Germany | . |
| 54-23877 | 2/1979 | Japan | 303/117.1 |
| 173363 | 7/1987 | Japan | 303/117.1 |
| 3-65461 | 3/1991 | Japan | . |
| 3-121969 | 5/1991 | Japan | . |

Primary Examiner—Robert J. Oberleitner
Assistant Examiner—Peter M. Poon
Attorney, Agent, or Firm—Lowe, Price, LeBlanc & Becker

[57] ABSTRACT

A fluid pressure control valve comprises a valve housing slidably accommodating a valve spool which is responsive to an incoming fluid pressure for producing a controlled fluid pressure depending on an axial position of the spool, a biasing member disposed in the valve housing for biasing the spool in a pressure buildup direction, a reaction piston receiving the controlled fluid pressure to generate a reaction acting on the spool to move the spool in a pressure reduction direction, and an electromagnetic solenoid including a solenoid plunger having an outer diameter greater than the spool. The plunger engages the spool to move the spool in the pressure reduction direction by attraction of the solenoid. The biasing member includes a pilot piston engaging the spool and receiving the master-cylinder pressure to push the spool in the pressure buildup direction. A pressure-receiving area of the pilot piston is designed to be greater than that of the reaction piston by a predetermined amplification.

6 Claims, 12 Drawing Sheets

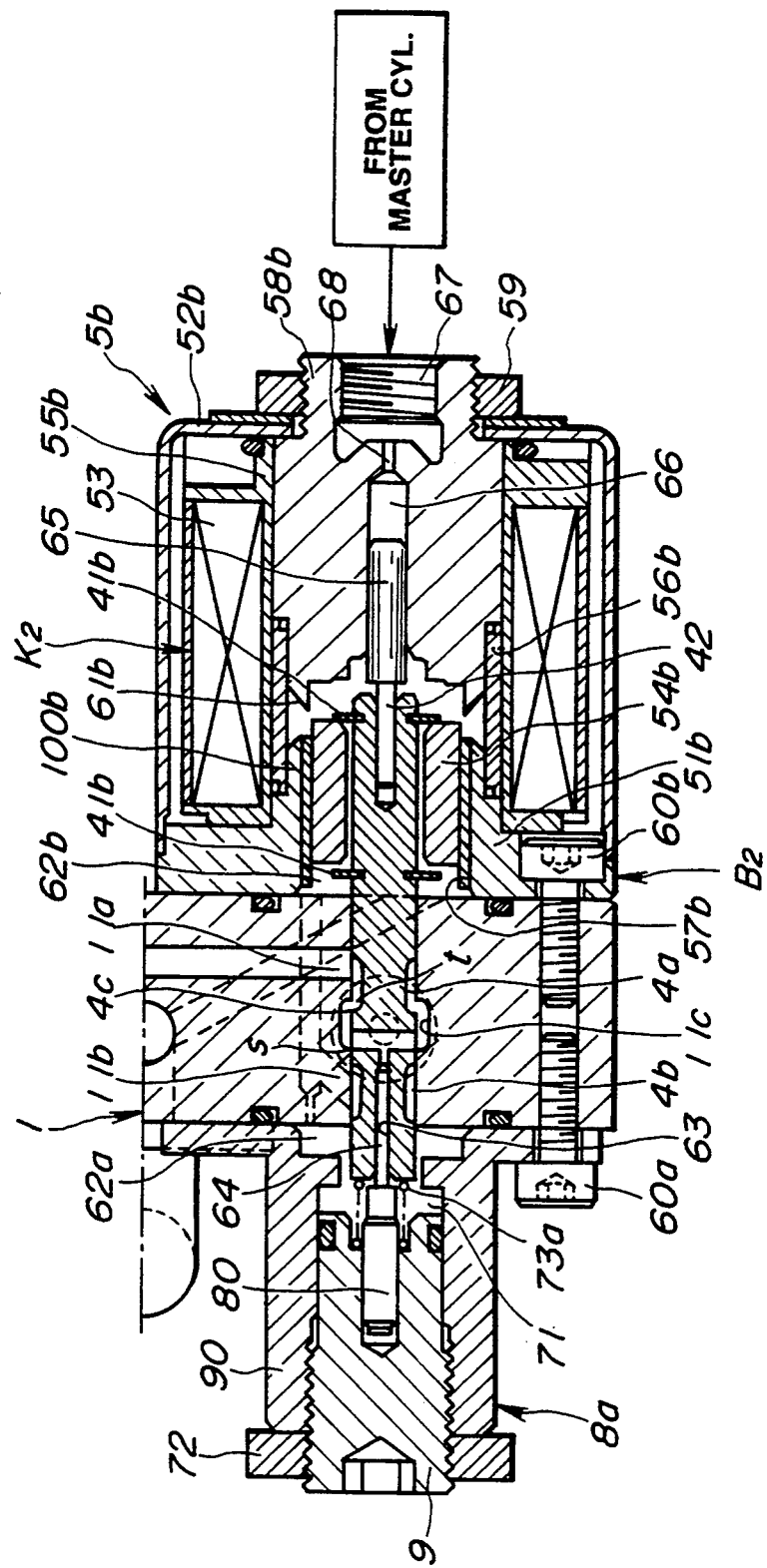

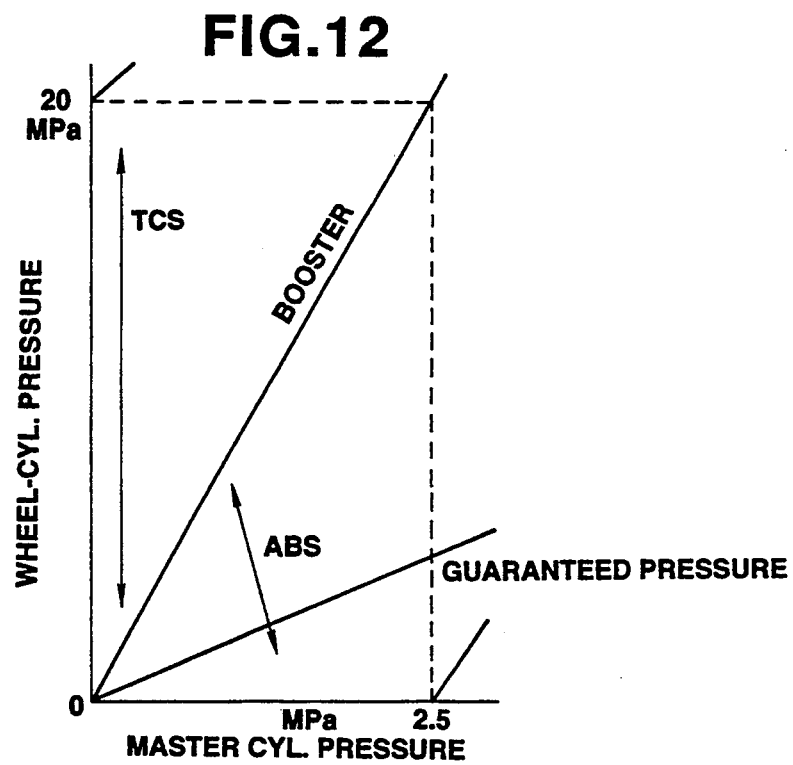
FIG.12
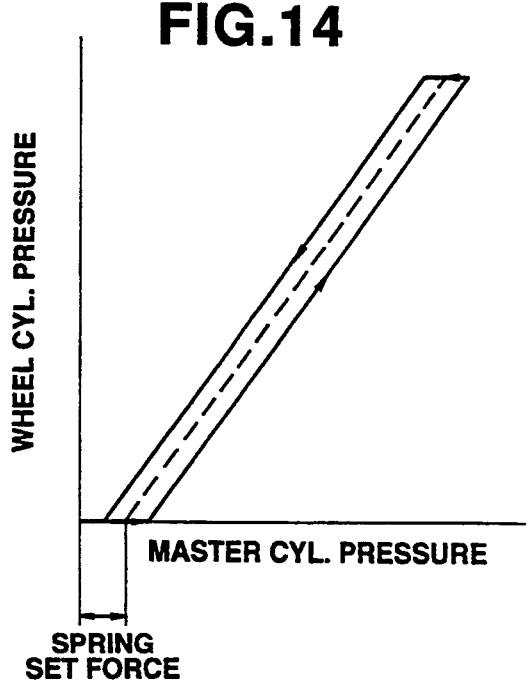
FIG.14
FIG.13A
FIG.13B

FLUID PRESSURE CONTROL VALVE

BACKGROUND OF THE INVENTION

1. Field of the Invention

The present invention relates to a fluid pressure control valve which is optimally applied to a hydraulic brake system with an anti-skid brake control system generally abbreviated as an "ABS" and/or a traction control system generally abbreviated as a "TCS", and specifically to a fluid pressure controlling spool valve with at least one electromagnetic solenoid which is responsive to the magnitude of a control signal value to suitably adjust the outgoing fluid pressure.

2. Description of the Prior Art

There have been proposed and developed various fluid pressure control valves which can properly vary the incoming fluid pressure to generate a controlled fluid pressure to a fluid pressure-actuated cylinder, such as a vehicle wheel cylinder. For example, Japanese Patent First Publication (Tokkai Heisei) No. 3-65461 discloses a brake fluid pressure control system employing a master cylinder equipped with a hydraulic brake force booster and a plurality of electromagnetic solenoid valves each fluidly disposed between the outlet port of the master cylinder and the inlet-and-outlet port of the wheel cylinder. In the Japanese Patent First Publication No. 3-65461, an anti-skid brake control or a traction control is achieved by switching the respective valve positions of the plural solenoid valves which consist of four three-port/three-position directional control valves mainly contributing to an anti-skid brake control and two two-port/two-position directional control valves mainly contributing to a traction control. The above-mentioned booster device and plural solenoid valves are not integrally formed as a unit but constructed independently of each other. As a consequence, the total weight of the system is relatively heavy and the size of the system is relatively large. It is troublesome to mount such a prior art brake fluid pressure control system in a limited space of the vehicle. In more recent years, there have been proposed brake fluid pressure controlling spool valves which are operable according to an anti-skid brake control. Such a spool valve is designed to adjust the magnitude of the outgoing fluid pressure depending on the axial position of the slidable spool. One such conventional brake fluid pressure controlling spool valve has been disclosed in Japanese Patent First Publication (Tokkai Heisei) No. 3-121969. The conventional fluid pressure controlling spool valve is incorporated into an automotive brake fluid pressure control system to generate a controlled outgoing fluid pressure, i.e., a desired wheel-cylinder pressure by properly adjusting an incoming fluid pressure, i.e., a master-cylinder pressure. The conventional fluid pressure controlling spool valve generally comprises a spool being made of a magnetic material, a return spring normally biasing the spool toward the wheel-cylinder pressure buildup side, and an electromagnetic solenoid attracting the spool toward the wheel-cylinder pressure reduction side. In the above-noted spool valve, the spool has a relatively large diameter to enhance the attraction of the solenoid because the spool itself functions as a solenoid plunger. Therefore, there is a possibility of oil leakage between the outer periphery of the large-diameter spool and the inner periphery of the valve housing. The larger the diameter of the spool becomes, the greater oil leakage becomes. Conversely, the smaller the diameter of the spool becomes, the smaller attracting force of the solenoid becomes. In the previously-noted construction of the conventional spool valve, it is difficult to satisfy both of the above two conditions.

SUMMARY OF THE INVENTION

It is, therefore in view of the above disadvantages an object of the present invention to provide an improved fluid pressure control valve unit employing an outgoing pressure adjusting spool and an electromagnetic solenoid, which can effectively provide an attracting force enough to move the spool and reduce oil leakage between the outer periphery of the spool and the inner periphery of the valve housing to a minimum.

It is another object of the invention to provide a small-sized brake fluid pressure control system employing a fluid pressure controlling spool valve arrangement which enables the construction of the system to be simplified and the assembly of the system on the vehicle to be facilitated.

It is a further object of the invention to provide a small-sized brake fluid pressure control system incorporating a fluid pressure controlling spool valve unit which unit is integrally formed with an anti-skid brake controlling portion and a hydraulic brake booster portion.

It is a still further object of the invention to provide a small-sized brake fluid pressure control system incorporating a fluid pressure controlling spool valve unit which unit is integrally formed with an anti-skid brake control portion, a hydraulic brake booster portion, and a traction control portion.

It is another object of the invention to provide a small-sized brake fluid pressure control system incorporating a fluid pressure controlling electromagnetic proportioning solenoid valve unit which unit is integrally formed with an anti-skid brake control portion, a hydraulic brake booster portion, a traction control portion, and a fail-safe valve portion.

In brief, the above objects are achieved by a fluid pressure controlling spool valve constructed as a single valve unit in which an electromagnetic solenoid is coaxially arranged with respect to a spool slidably disposed in the valve housing and formed of non-magnetic material, and a relatively large-diameter plunger of the solenoid is coaxially arranged on the outer periphery of the spool or arranged in series to the spool so as to effectively attract the spool. Additionally, the improved spool valve includes a reaction piston which is slidably disposed in an axial bore bored along the center axis of one end of the spool. The reaction piston has one end projecting out of the spool and the other end receiving a controlled fluid pressure properly adjustable in the valve. The maximum axial movement of the one end of the reaction piston is restricted by a stopper attached to the valve housing, with the result that a reaction is applied to the spool owing to the controlled fluid pressure received by the other end of the reaction piston upon the one end abuts the stopper, so as to reduce the controlled fluid pressure output from the valve unit.

According to one aspect of the invention, a fluid pressure control valve, comprises a valve housing slidably accommodating therein a valve spool, the valve spool responsive to an incoming fluid pressure introduced from a fluid pressure source into the pressure control valve, for producing a controlled fluid pressure output therefrom depending on an axial position of the spool, a biasing means disposed in the valve housing, for biasing the spool in a pressure buildup direction in which the controlled fluid pressure is increased, a reaction piston slidably axially disposed in one end of the spool so that one projecting end of the reaction piston is in contact with a stopper attached to the valve housing and that the other end of the reaction piston receives the controlled fluid pressure, the reaction piston generating a reaction acting on the spool to move the spool in a pressure reduction direction in which the controlled fluid pressure is reduced, and an electromagnetic solenoid including an axially slidable solenoid plunger having an outer diameter greater than the spool, the plunger engaging the spool to move the spool in the pressure reduction direction by attraction of the solenoid.

According to another aspect of the invention, an automotive brake fluid pressure control system equipped with an anti-skid brake control unit and a traction control unit, comprises a master cylinder for generating a master-cylinder pressure depending on a brake-pedal depression, an external hydraulic pressure source for generating an external hydraulic pressure, a wheel cylinder and a proportioning electromagnetic solenoid type pressure-control valve unit. The pressure-control valve unit includes a valve housing slidably accommodating therein a valve spool which is responsive to an incoming fluid pressure introduced from a fluid pressure source into the pressure control valve unit, for producing a controlled fluid pressure output therefrom depending on an axial position of the spool, a pilot piston engaging the other end of the spool at one end thereof and receiving the master-cylinder pressure at the other end thereof, the pilot piston being axially aligned with the spool, for pushing the spool in a pressure buildup direction in which the controlled fluid pressure is increased, by way of the received master-cylinder pressure, a return spring constantly biasing the spool in a pressure reduction direction in which the controlled fluid pressure is reduced, a reaction piston slidably axially disposed in one end of the spool so that one projecting end of the reaction piston is in contact with a stopper attached to the valve housing and that the other end of the reaction piston receives the controlled fluid pressure; the reaction piston generating a reaction acting on the spool to move the spool in the pressure reduction direction, a first electromagnetic solenoid including a first axially slidable solenoid plunger having an outer diameter greater than the spool, the first plunger engaging the other end of the spool to move the spool in the pressure reduction direction by attraction of the first solenoid, and a second electromagnetic solenoid including a second axially slidable solenoid plunger having an outer diameter greater than the spool, the second plunger engaging the other end of the spool to move the spool in the pressure buildup direction by attraction of the second solenoid. A pressure-receiving area of the pilot piston is greater than that of the reaction piston by a predetermined amplification. The brake fluid pressure control system may further comprise a fail-safe valve unit integrally mounted on the proportioning electromagnetic solenoid type pressure-control valve unit. The fail-safe valve unit is responsive to the pressure difference between the master-cylinder pressure and the external hydraulic pressure, for selecting a higher one of the master-cylinder pressure and the external hydraulic pressure as a fluid pressure to be controlled in the pressure-control valve unit.

BRIEF DESCRIPTION OF THE DRAWINGS

FIGS. 11A and 11B are cross-sectional views respectively illustrating the upper half of the fluid pressure control valve of the fourth embodiment shown in FIG. 9 and the lower half of the same.

FIG. 12 is a graph illustrating fluid pressure characteristics of the fluid pressure control valve of the fourth embodiment of FIGS. 9 and 10.

FIGS. 13A and 13B are timing charts illustrating two waveforms of dither currents applied to a solenoid activated in a phase of an anti-skid brake control and a solenoid activated in a phase of a traction control, respectively.

FIG. 14 is a graph illustrating a fluid pressure characteristic of the fluid pressure control valve during application of the dither current.

DESCRIPTION OF THE PREFERRED EMBODIMENTS

First embodiment

Figure 1:
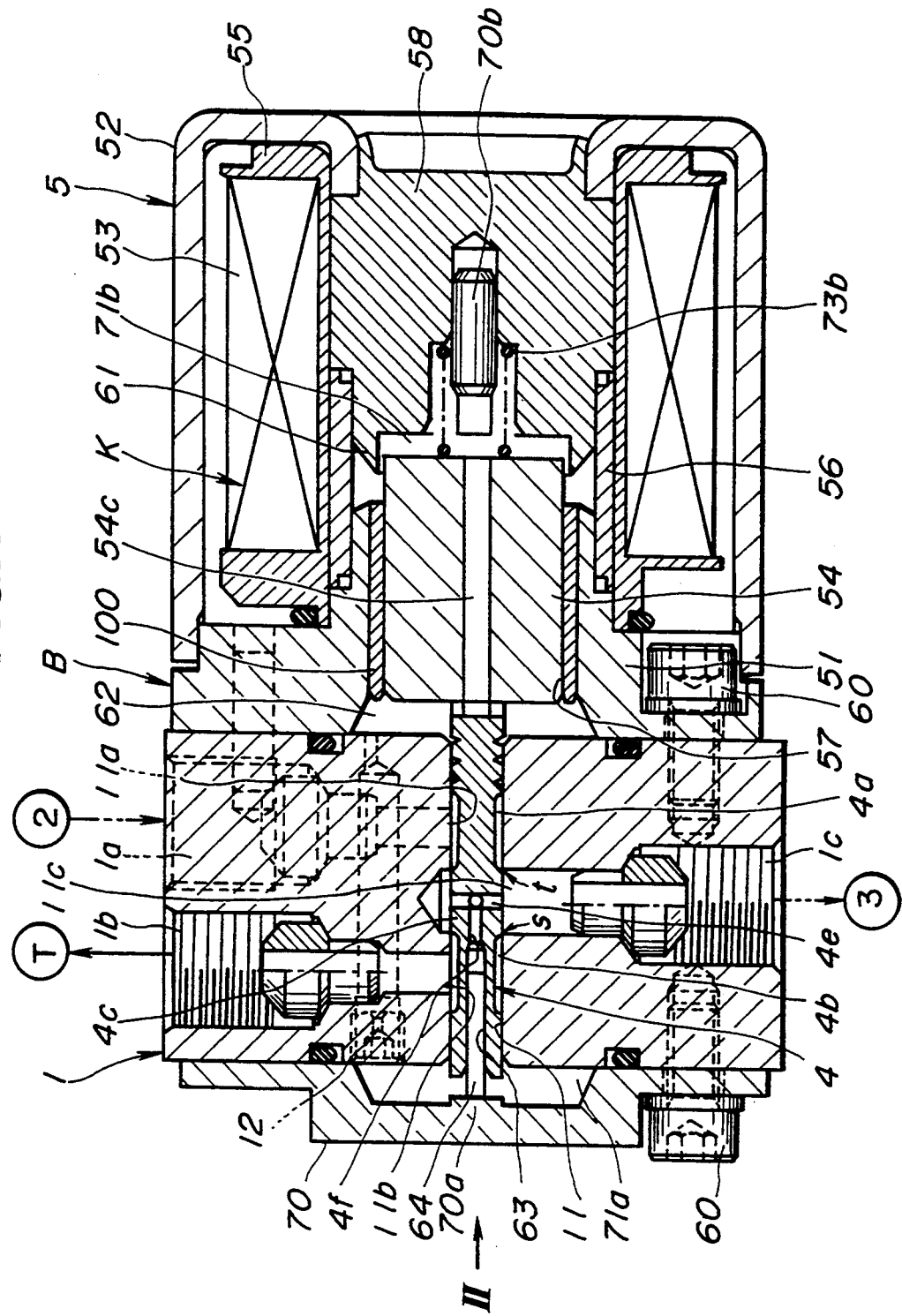
FIG. 1 is a cross-sectional view taken along the line I—I of FIG. 2 and illustrating a first embodiment of a fluid pressure control valve according to the invention.
Figure 2:
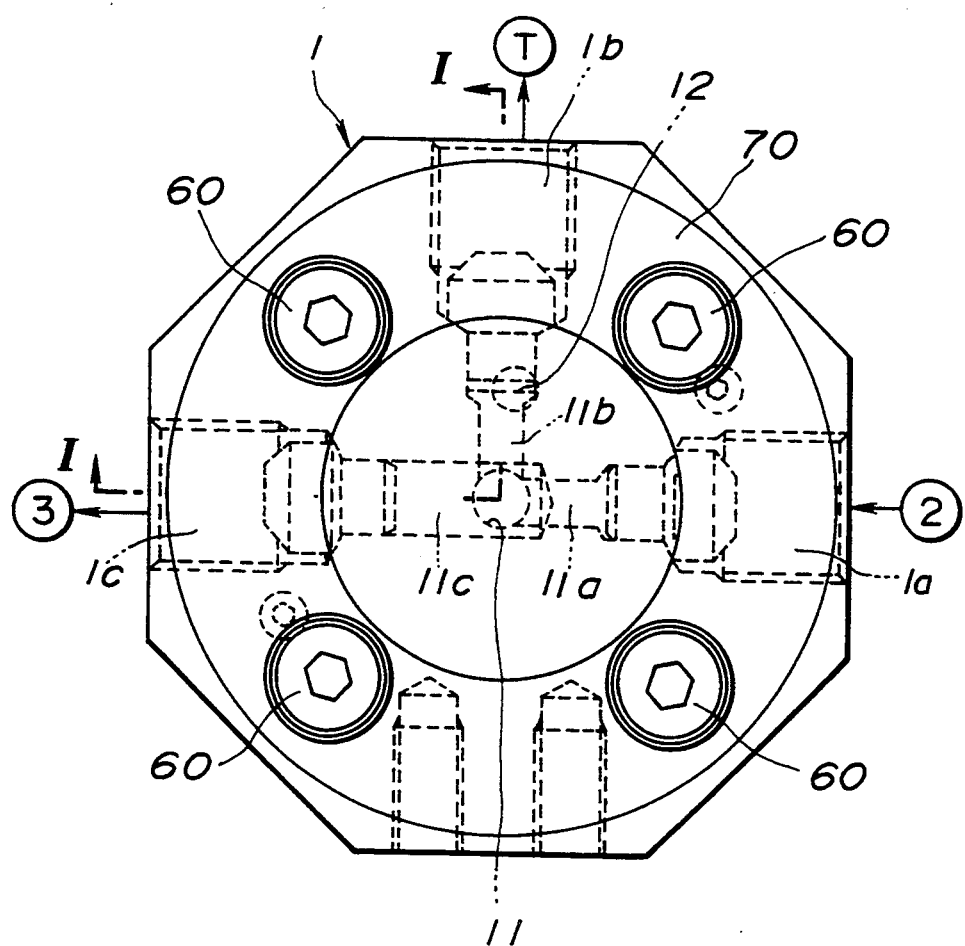
FIG. 2 is a view taken in the direction of the arrow II of FIG. 1.
Figure 3:
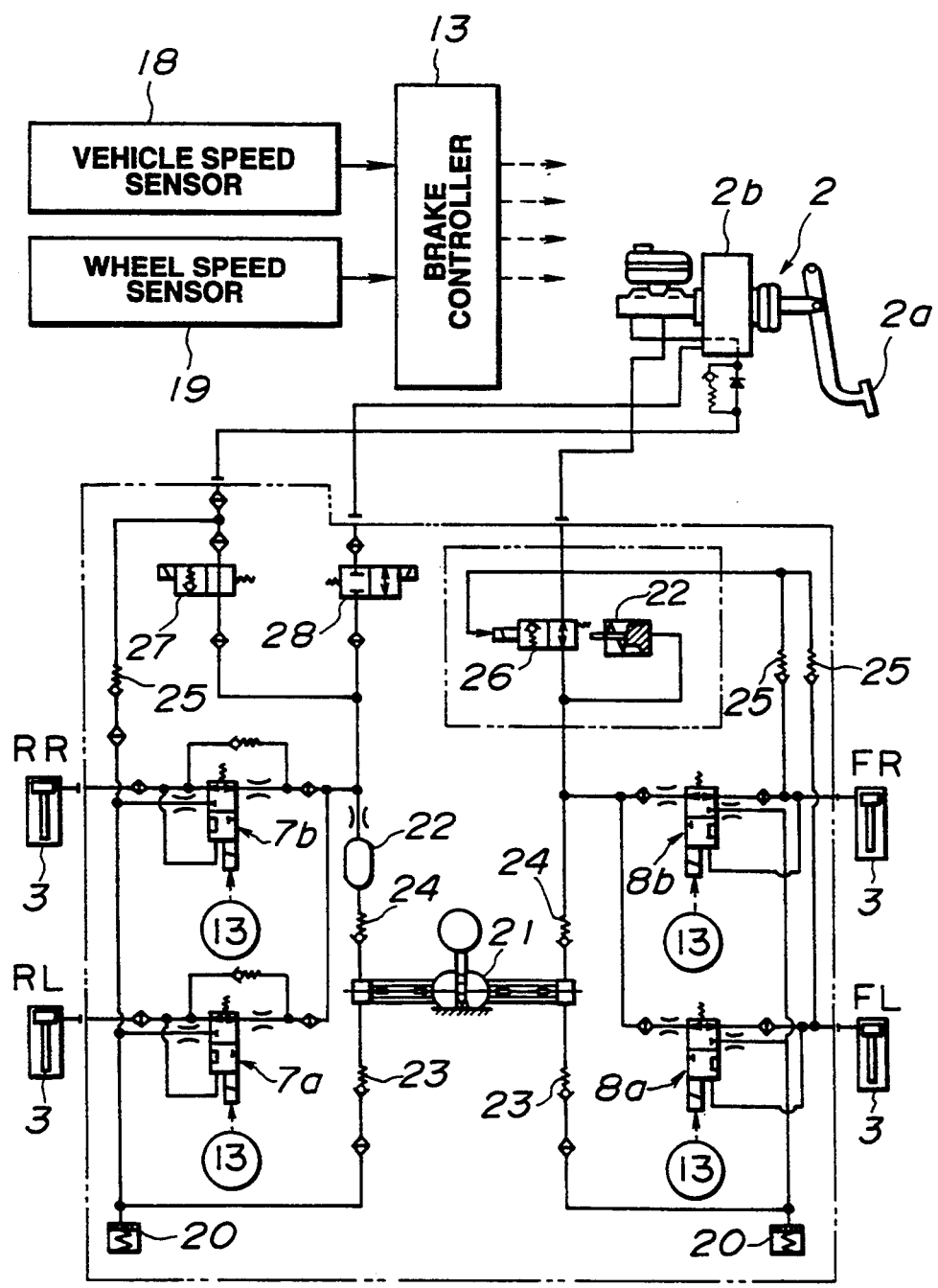
FIG. 3 is a schematic system diagram illustrating a brake fluid pressure control system utilizing the fluid pressure control valve illustrated in FIGS. 1 and 2.

Referring now to the drawings, particularly to FIGS. 1, 2 and 3, the fluid pressure control valve of the present invention is exemplified in case of an ABS fluid pressure control valve applied to an anti-skid brake control system incorporated in an automotive brake system. As shown in FIG. 3, four ABS fluid pressure control valves 7a, 7b, 8a and 8b are fluidly disposed in the brake lines arranged between a tandem master cylinder 2 and four wheel brake cylinders 3. The four ABS fluid pressure control valves 7a, 7b, 8a and 8b connected respectively to the rear-left, rear-right, front-left and front-right wheels have an identical valve structure shown in FIGS. 1 and 2. The fluid pressure control valve of the first embodiment includes a valve housing 1 defining therein a cylindrical axial bore 11. The valve housing 1 has a hydraulic pressure supply port 11a exposing the axial bore 11, a drain port 11b exposing the axial bore 11, and a controlled fluid pressure port 11c connected to either one of the wheel cylinders 3 to generate a controlled fluid pressure hereinafter described in detail. As appreciated from the system diagram as shown in FIG. 3, the pressure supply port 11a is connected through a brake fluid pressure inlet port 1a to the master cylinder 2. The drain port 11b is connected through an outlet port 1b to a brake fluid reservoir or tank T. Thus, a low pressure such as atmospheric pressure is constantly introduced into the outlet port 1b. The controlled fluid pressure port 11c is connected through a wheel-cylinder side connection port 1c to the wheel cylinder 3.

A spool 4 is slidably enclosed in the axial bore 11. The spool 4 is formed with a right side annular communication groove 4a arranged for establishing a fluid communication between the two ports 11a and 11c, and a left side annular communication groove 4b arranged for establishing a fluid communication between the two ports 11b and 11c. An essentially central land 4c is defined between the above-noted two annular grooves 4a and 4b, in a manner which blocks the respective fluid communications between the ports 11a and 11c and between the ports 11b and 11c, in a centralized neutral position of the spool 4. As clearly seen in FIG. 1 wherein the valve spool is conditioned in its neutral position, the right end of the land 4c is cooperative with the port 11c to define a variable throttling orifice t, while the left end of the land 4c is cooperative with the port 11c to define a variable throttling orifice s. When the spool 4 moves leftwards (viewing FIG. 1) from the neutral position, the orifice s is fully closed and the orifice t is opened such that the opening degree of the orifice t is gradually increased in accordance with an increase in the leftward sliding movement of the spool 4. Thus, the wheel-cylinder pressure is gradually increased in accordance with the leftward movement of the spool 4. Conversely, when the spool 4 moves rightwards from the neutral position, the orifice t is fully closed to prevent the master-cylinder pressure from being supplied to the wheel cylinder and the orifice s is opened such that the opening degree of the orifice s is gradually increased in accordance with an increase in the rightward sliding movement of the spool 4 and thus the wheel-cylinder pressure gradually reduced. In other words, the controlled fluid pressure created by the spool valve is continuously varied depending on a relative displacement of the spool 4 to its neutral position, in a manner so as to be increased according to the leftward sliding movement of the spool and to be decreased according to the rightward sliding movement of the spool.

The controlled fluid pressure port 11c consists of a cylindrical hollow penetrating the axial bore 11 perpendicularly thereto. In addition, the inner diameter of the port 11c is designed to be greater than that of the bore 11. Therefore, the controlled fluid pressure created by the spool valve acts uniformly on the outer peripheral surface of the spool 4. This prevents undesirable radial force from acting on the spool 4. On the other hand, the supply port 11a and the drain port 11b radially extend from the axial bore 11. The inner diameter of each port 11a and 11b is designed to be smaller than that of the axial bore 11, with the result that atmospheric pressure introduced through the drain port 11b to the annular groove 4b acts uniformly onto the outer periphery of the spool 4 and the master-cylinder pressure introduced through the supply port 11a to the annular groove 4a acts uniformly onto the outer periphery of the spool 4. As appreciated from the above, the port arrangement insures a smooth axial sliding movement of the spool 4 without undesirable friction owing to the radial force acting on the spool.

As shown in the right-hand side of the fluid pressure control valve of FIG. 1, an electromagnetic solenoid 5 is integrally attached to the right end of the valve housing 1, so as to cause an axial sliding movement of the spool 4 by attraction of the activated solenoid. Upon the solenoid 5 being activated, the spool 4 is moved rightwards (viewing FIG. 1), with the result that the controlled fluid pressure in the port 11c is reduced. The solenoid 5 is comprised of a solenoid body B, an essentially cylindrical coil portion K, and a solenoid plunger 54. The solenoid body B consists of a base 51 attached onto the right end of the valve housing 1, an intermediate cylindrical member 56, and an attracting member 58. The base 51 is comprised of a flange through which the base is detachably attached onto the right end of the valve housing 1 by means of bolts 60 and a relatively small-diameter boss-like portion onto which the intermediate cylindrical member 56 is fitted at one end thereof. The attracting member 58 is fitted to the other end of the intermediate member 56. The coil portion K is comprised of an exciting coil 53, a bobbin 55 winding the coil 53 thereon, and a protective coil casing 52 for the exciting coil. The bobbin 55 is made of non-magnetic material. The base 51 has an axial bore 57 defining a plunger chamber 62 which slidably accommodates the solenoid plunger 54 through a bushing 100. Note that the inner diameter of the plunger chamber 62 is designed to be greater than that of the spool bore 11. The attracting member 58, the coil casing 52, the base 51, and the bushing 100, and the solenoid plunger 54 are made of magnetic material, in order to provide a path for a magnetic loop. The attracting member 58 is formed with a magnetic leakage edge 61 having a triangle in cross-section, so as to cause the solenoid to produce magnetic attracting force for the spool 4. The attracting member 58 also defines a stepped axial bore 71b therein. The stepped bore 71b is comprised of a relatively large-diameter outermost bore section serving as a back chamber facing the right end of the plunger 54, an intermediate bore section operably accommodating a return spring 73b, and a relatively small-diameter innermost bore section into which a stopper pin 70b is press-fitted. The back chamber of the bore 71b and the plunger chamber 62 are communicated with each other by way of a through opening 54c extending along the central axis of the plunger 54. Since the return spring 73b is disposed between the right end of the plunger 54 and the attracting member 58 in its pre-compressed state, the bias of the spring 73b is transmitted via the plunger 54 to the right end of the spool 4. Thus, the spool 4 is normally biased leftwards by way of the return spring 73b. Under the deactivated condition of the solenoid, since the spool is held in its leftmost position by the spring bias, the orifice t is fully opened and the orifice s is fully closed and thus the controlled fluid pressure (wheel-cylinder pressure) becomes essentially equivalent to the master-cylinder pressure.

As shown in the left-hand side of the fluid pressure control valve of FIG. 1, a hat-shaped valve cover 70 is firmly secured onto the left end of the valve housing 1 by means of bolts 60. The valve cover 70 is cooperative with the left end surface of the valve housing 1 to define therein a fluid pressure chamber 71a, so that the fluid pressure chamber 71a is communicated with the axial bore 11. The cover 70 is formed with a slightly projected stopper 70a opposing the end of the spool facing apart from the plunger 54. The spool 4 has a small-diameter axial bore 63 defined in the left-hand side thereof and extending along the central axis. The spool also includes an axially extending communication fluid passage 4f and a radially extending fluid passage 4e communicating the axial communication passage 4f. The axial bore 63 slidably accommodates a parallel-pin type reaction piston 64 hereinbelow described in detail. The axial bore 63 is communicated through the axial communication passage 4f and the radial fluid passage 4e with the wheel-cylinder side port 11c. As illustrated by the broken line of FIG. 1, the fluid pressure chamber 71a is communicated via a fixed orifice 12 with both the drain port 11b and the plunger chamber 62, so as to prevent the sliding movement of the spool 4 from being dampened. That is to say, the above-mentioned fluid communication between the chamber 71a, the drain port 11b and the plunger chamber 62 is designed so that the fluid prevailing in the plunger chamber 62 is smoothly exhausted therefrom according to the leftward movement of the plunger 54 and the fluid prevailing in the chamber 71a is smoothly exhausted therefrom according to the leftward movement of the spool owing to the leftward movement of the plunger 54 and the orifice 12 acts to prevent the fluid in the plunger chamber 62 from being introduced into the chamber 71a owing to the leftward movement of the plunger 54. In addition to the above, the above fluid communication permits the fluid flow from the drain port 11b into the two chambers 62 and 71a during the rightward stroke of the plunger 54.

The reaction piston 64 has one end projecting out of the spool 4 and the other end receiving the controlled fluid pressure in the port 11c. The maximum axial movement of the reaction piston 64 is restricted by the stopper 70a of the valve cover 70. With this arrangement, a reaction created by abutment between the stopper 70a and the left end of the reaction piston 64 is applied to the spool 4, and as a result the spool tends to be moved rightwards. The fluid pressure control valve of the first embodiment operates as follows.

Under the deactivated state of the solenoid 5, the spool 4 is moved leftwards by the bias of the spring 73b. As a consequence, the spool 4 is held in the leftmost position, with the result that the variable throttling orifice s is held in the fully closed state, while the variable throttling orifice t is held in the fully open state. Under this condition, the master-cylinder pressure is supplied via the port 11c directly to the wheel cylinder 3 and thus the wheel-cylinder pressure becomes equivalent to the master-cylinder pressure. On the other hand, the reaction piston 64 acts to apply a reaction force to the spool 4 and to cause a rightward movement of the spool, upon the reaction piston 64 abuts the stopper 70a. Thus, the right end of the spool 4 is constantly brought into contact with the left end of the plunger 54. However, since the biasing force of the return spring 73b is designed to be greater than the maximum reaction force caused by the maximum value of the master-cylinder pressure and as a result the bias of the spring 73b acts to move the spool in the leftward direction against the reaction of the reaction piston 64, the spool is held stationary in its leftmost position. Accordingly, the master-cylinder pressure is fed via the fully opened orifice t to the wheel cylinder and consequently the wheel-cylinder pressure becomes equivalent to the master-cylinder pressure.

When the solenoid 5 is activated, the exciting coil 53 produces a magnetic loop in cooperation with a series of magnetic-material parts, namely the coil casing 52, the base 51, the attracting member 58, the bushing 100, and the plunger 54. As a result, a magnetic attracting force is produced by way of the magnetic leakage edge 61 formed at the innermost end of the attracting member 58. The attracting force acts on the plunger 54 in such a manner as to cause the axial rightward movement of the plunger 54 against the bias of the spring 73b. Supposing that a value of the exciting current applied to the coil 53 is relatively small and the sum of the reaction force of the reaction piston 64 and the magnetic attraction force is less than the bias of the spring 73b, the two slidable members, i.e., the spool 4 and the plunger 54 are not moved rightward but still held in their leftmost positions. In this case, since the master-cylinder pressure is fed via the orifice t to the wheel cylinder 3 and thus the wheel-cylinder pressure is held constant at a pressure level equivalent to the master-cylinder pressure, as shown by the broken line a of FIG. 4. Under this condition, if the value of the exciting current is further increased and the sum of the reaction force and the attraction force exceeds the current spring bias, the spool becomes moved rightwards. Since the bias of the spring 73b consisting of a compression is gradually increased in accordance with the rightward movement of the plunger 54, the rightward movement of the solenoid plunger, i.e., the rightward movement of the spool is stopped at a position in which the sum of the reaction force and the attraction force is balanced to the spring bias. As a result, the orifice t is gradually choked and finally closed, while the orifice s is gradually opened and its opening degree is increased. Thus, increased is the flow rate of the fluid exhausted from the drain port 11b via the orifice s. As a consequence, the controlled fluid pressure in the port 11c is reduced in reverse proportion to an increase in the exciting current applied to the coil 53, as shown by the broken line b of FIG. 4. As appreciated from FIG. 4, the fluid pressure control valve of the first embodiment is comprised of a proportioning electromagnetic solenoid type pressure-control spool valve in which the output fluid pressure is reduced in reverse proportion to the magnitude of the exciting current.

Referring now to FIG. 3, the brake fluid pressure control system for a rear-wheel drive vehicle incorporating the fluid pressure control valve of the first embodiment is hereinbelow described in more detail.

As seen in FIG. 3, four fluid pressure control valves 7a, 7b, 8a and 8b each having the same valve structure as the electromagnetic solenoid type spool valve of the first embodiment are connected to the rear-left and rear-right driven wheels, and the front-left and front-right non-driven wheels, respectively. A tandem master cylinder 2 with a hydraulic brake force booster 2b is used in the brake system in a conventional manner, since the fluid pressure control valve of the first embodiment does not have a hydraulic pressure multiplying function. The master cylinder 2 is responsive to the depression of the brake pedal 2b to output the master-cylinder pressure multiplied by way of the booster 2b. The system includes a pair of brake fluid reservoirs 20, so as to temporarily store the brake fluid returned from the wheel cylinders at an ABS pressure reduction mode in which the wheel-cylinder pressure is reduced. One of the reservoirs 20 is fluidly disposed in the rear wheel-cylinder side return line, while the other reservoir 20 is fluidly disposed in the front wheel-cylinder side return line. The system includes a return pump 21 arranged downstream of the reservoirs 20 and connected to the two return lines 20r, for returning the brake fluid in the reservoirs 20 to the master cylinder side. The system also includes a pair of pressure accumulators 22 arranged downstream of the return pump 21 and respectively connected to the rear wheel-cylinder side return line and the front wheel-cylinder side return line, for preventing a high fluid pressure caused by the pump 21 from being directly applied to the master cylinder 2. In each brake fluid return line 20r, an upstream check valve 23 is arranged between the pump 21 and the reservoir 20 for preventing a brake fluid flow back to the reservoir 20 during operation of the pump 21, while a downstream check valve 24 is arranged in the return line 20r just downstream of the pump 21 for preventing the brake fluid discharged from the pump 21 from returning to the pump 21. The return pump 21 is generally referred to as an "ABS pump", because the pump 21 comes into operation in a wheel-cylinder pressure reduction mode during anti-skid brake control. A bypass check valve 25 is fluidly disposed in a bypass line arranged in parallel with the respective return line for bypassing the brake fluid in the wheel cylinder to the master cylinder side during the ABS pressure reduction mode. A pilot-operated valve 26 is fluidly disposed in the front wheel side main brake line 15a for preventing a high-pressure fluid caused by the pump 21 from being applied directly to the master cylinder 2 in cooperation with the front wheel-cylinder side pressure accumulator 22 and for avoiding an undesirable pedal feeling owing to the resultant brake fluid pressure when the brakes are released. The brake fluid pressure control system also includes a first switching valve 27, such as a two-position/two-port directional control valve arranged for permitting and shutting off the master-cylinder pressure supply to the rear side wheel cylinders, and a second switching valve 28, such as a two-position/two-port directional control valve arranged for producing a braking force by supplying the fluid pressure in the booster chamber in the booster 2b to the rear wheel cylinders. During usual braking, the first switching valve 27 is held in a valve fully open state, while the second switching valve 28 is held closed, as shown in FIG. 3. During traction control, the first switching valve 27 is shifted to its closed state, while the second switching valve 28 is shifted to its open state. The fluid pressure in the booster chamber is fed to the rear wheel cylinders, without depression of the brake pedal 2a. As set forth above, the pair of switching valves 27 and 28 also function as "TCS switching valves". During anti-skid brake control, the first switching valve 27 is held fully opened, while the second switching valve 28 is held fully closed. Thus, a brake fluid of the rear wheel cylinder side can be returned through the valve 27 to the master cylinder side in the ABS pressure reduction phase. Conversely, in the ABS pressure buildup phase a brake fluid of the master cylinder side can be fed through the valve 27 to the rear wheel cylinder side. In the front brake system, the pilot-operated valve 26 is switched between a valve full-open position corresponding to a spring set position and the other valve position corresponding to a check valve position, depending on all the phases of pressure reduction, holding, and buildup in the front wheel cylinder. In the ABS pressure reduction phase, the valve 26 is held in its spring set position shown in FIG. 3, and therethrough a brake fluid of the front wheel cylinder side is returned to the master cylinder side. Upon the front wheel-cylinder pressure becomes reduced to a desired pressure level in accordance with the returning of the brake fluid, the valve 26 is switched to the check valve position by way of the master-cylinder side fluid pressure serving as a pilot pressure and thus the valve 26 blocks a brake fluid flow from the front wheel cylinder side to the master cylinder side, with the result that the front wheel-cylinder pressure is held constant. In the ABS pressure buildup phase, the valve 26 is held in its full-open position to permit a fluid flow from the master cylinder side to the front wheel cylinder side. In a known manner, the system also includes a vehicle speed sensor 18, a wheel speed sensor 19, and a brake controller 13 which controller derives a slip rate of each of the wheels on the basis of the vehicle speed indicative signal value and the wheel speed indicative signal values of the respective wheels and generates a control signal based on the comparison of the detected slip rate with a predetermined criterion of the slip rate. The brake fluid pressure control system utilizing the fluid pressure control valve of the first embodiment operates as follows.

During usual braking, since the ABS and the TCS are both is kept in-operative, the solenoid 5 of the fluid pressure control valve is deactivated. Thus, the master-cylinder pressure is fed smoothly to the respective wheel cylinders 3 via the control valves 7a, 7b, 8a and 8b, since the respective valve spools 4 are held in their leftmost positions and in addition the first and second switching valves 27 and 28 are held in valve positions shown in FIG. 3. Depending on the depressing amount of the pedal 2a, a suitably multiplied braking force is produced by the master-cylinder pressure multiplied at the aid of the booster 2b. In more detail, in the rear brake system, the master-cylinder pressure is fed through the rear wheel side brake main brake line 15b and the valve 27 and fed parallel to the respective rear wheel cylinders via the control valves 7a and 7b. In the front brake system, the master-cylinder pressure is fed through the front wheel side main brake line 15a and the valve 26 and fed parallel to the respective front wheel cylinders via the control valves 8a and 8b.

Figure 4:
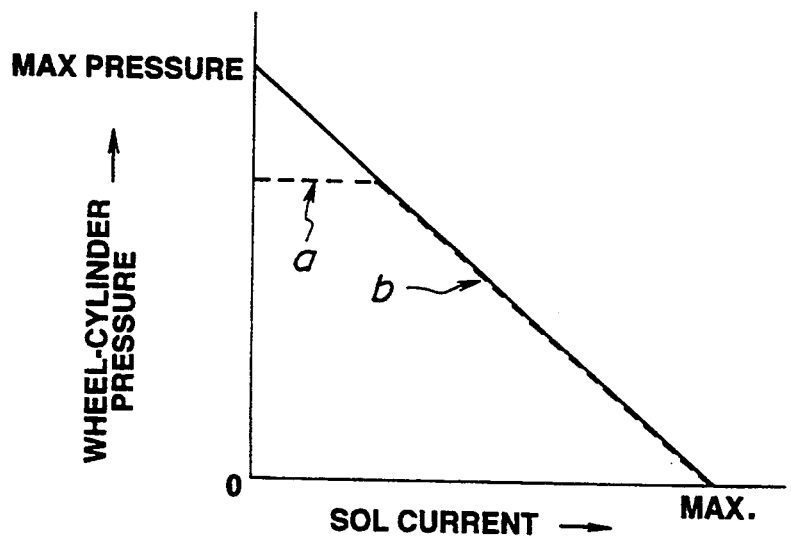
FIG. 4 is a graph illustrating a wheel-cylinder pressure versus solenoid exciting current characteristic in the fluid pressure control valve of the first embodiment.
Figure 5:
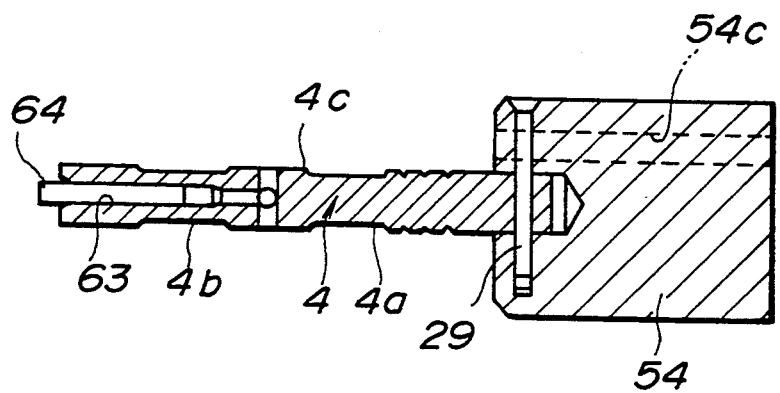
FIG. 5 is a longitudinal cross-sectional view illustrating a modification of the spool employed in the fluid pressure control valve of the first embodiment.

When the anti-skid brake control system (ABS) employed in the brake controller 13 determines that the road wheel is locked by excessive braking force during quick braking or during braking on a low frictional road, such as icy, wet or snow roads, the ABS comes into operation. During operation of the ABS, the ABS controls the magnitude of a control signal value, i.e., the magnitude of an exciting current applied to the solenoid 5, depending on the slip rate of each road wheel. As seen in FIG. 4, since each of the control valves 7a, 7b, 8a and 8b exhibits an output pressure characteristics according to which the controlled fluid pressure in the port 11c is reduced in reverse proportion to an increase in the exciting current, the wheel-cylinder pressure of the locked road wheel is reduced depending on its slip rate, in order to prevent the wheel lock. In this manner, the ABS controls the magnitude of the exciting current to reduce an excessive slip rate within the predetermined criterion. In the first embodiment, since the outer diameter of the valve spool 4 is designed to be smaller than that of the solenoid plunger 54, the control-valve arrangement ensures a relatively great attraction force caused by the solenoid 5 during operation of the ABS and reduces oil leakage between the outer periphery of the spool and the inner periphery of the valve housing to a minimum. Referring now to FIG. 5, the right end of the valve spool 4 may be fitted into the left end of the solenoid plunger 54 so that the spool 4 and the plunger 54 are assembled to each other by way of a knock pin 29. In this case, the through opening 54c is arranged to slightly offsetting from the central axis of the plunger 54. On the other hand, the valve spool shown in FIG. 1 is slotted at the right end and a fluid communication between the plunger chamber 62 and the back chamber 71b is established by the slotted end of the spool and the centralized through opening 54c.

Second embodiment

Figure 6:
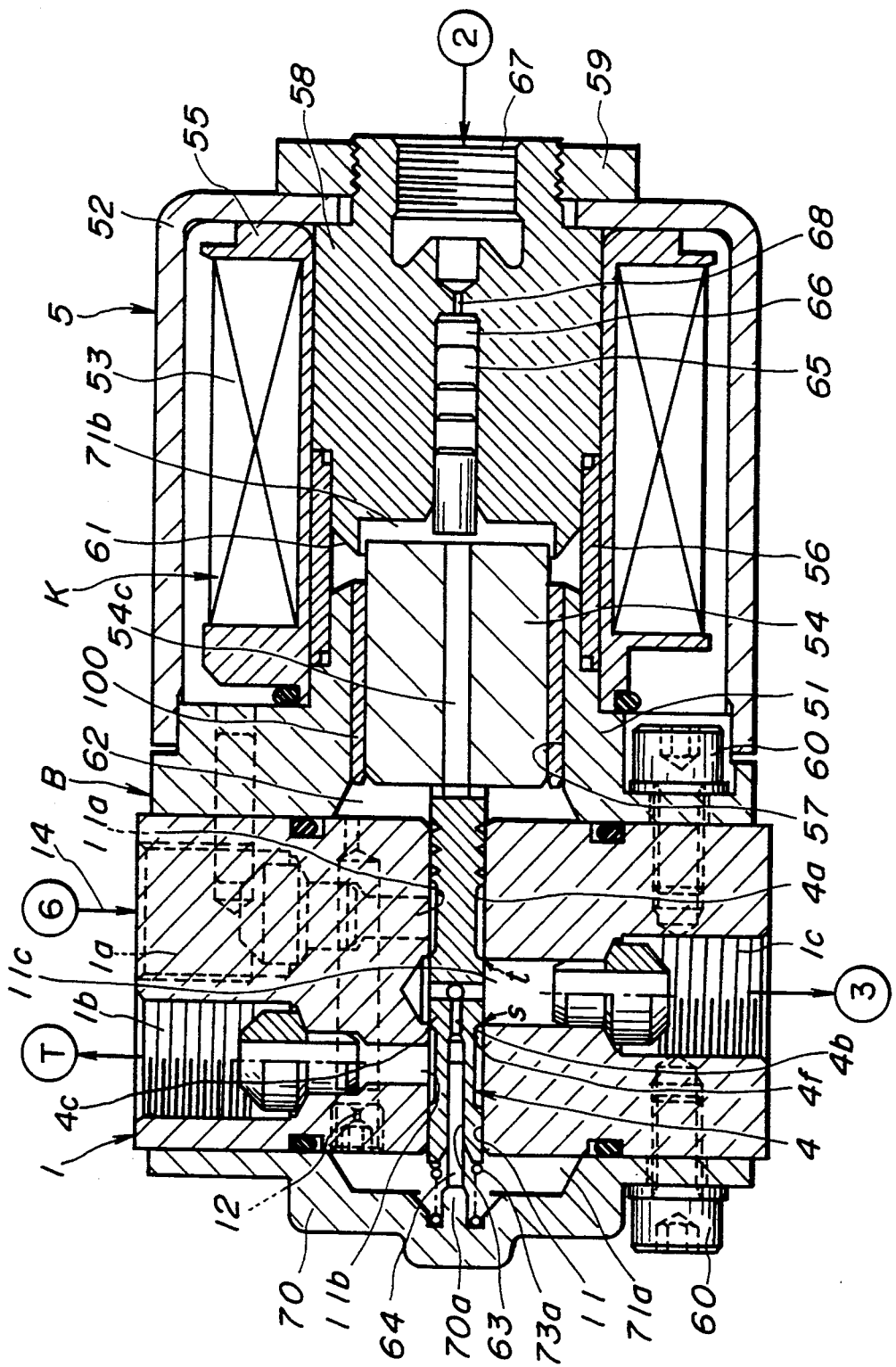
FIG. 6 is a cross-sectional view illustrating a second embodiment of a fluid pressure control valve according to the invention.

Referring now to FIG. 6, there is shown the second embodiment of the fluid pressure control valve applied to a brake fluid pressure control system. The basic control-valve structure of the second embodiment as shown in FIG. 6 is similar to that of the first embodiment as shown in FIGS. 1 and 2. Therefore, the same reference numerals used in the first embodiment will be applied to the corresponding elements used in the second embodiment of FIG. 6, for the purpose of comparison between the first and second embodiments. Furthermore, the same reference numerals as the first and second embodiments will be applied to the third and fourth embodiments hereinafter described in detail, for the purpose of simplification of the disclosure.

The second embodiment is different from the first embodiment in that a return spring 73a is arranged between the valve cover 70 and the left end of the spool 4 so that the bias of the spring 73a acts on the spool 4 in the same direction as the reaction caused by the reaction piston 64, and that a pilot piston 65 is slidably disposed in a center bore defined in the attracting member 58. A pilot chamber 66 is defined by the right end surface of the pilot piston 65 and the inner wall of the central bore of the attracting member 58. The pilot chamber 66 is communicated with the outlet port of the master cylinder 2 through a fixed orifice 68 and a pilot-pressure inlet port 67. The fixed orifice serves to prevent the sliding movement of the pilot piston 65 from being dampened and to ensure a smooth sliding movement of the piston 65 with a high responsiveness to the pilot pressure. The inlet port 67 receives the master-cylinder pressure as a pilot pressure. Although in the first embodiment the attracting member 58 is integrally formed with the coil casing 52 by caulking, the solenoid coil portion K of the control valve of the second embodiment is easily detachable since the casing 52 is detachably secured to the attracting member 58 by way of a nut 59.

Figure 7:
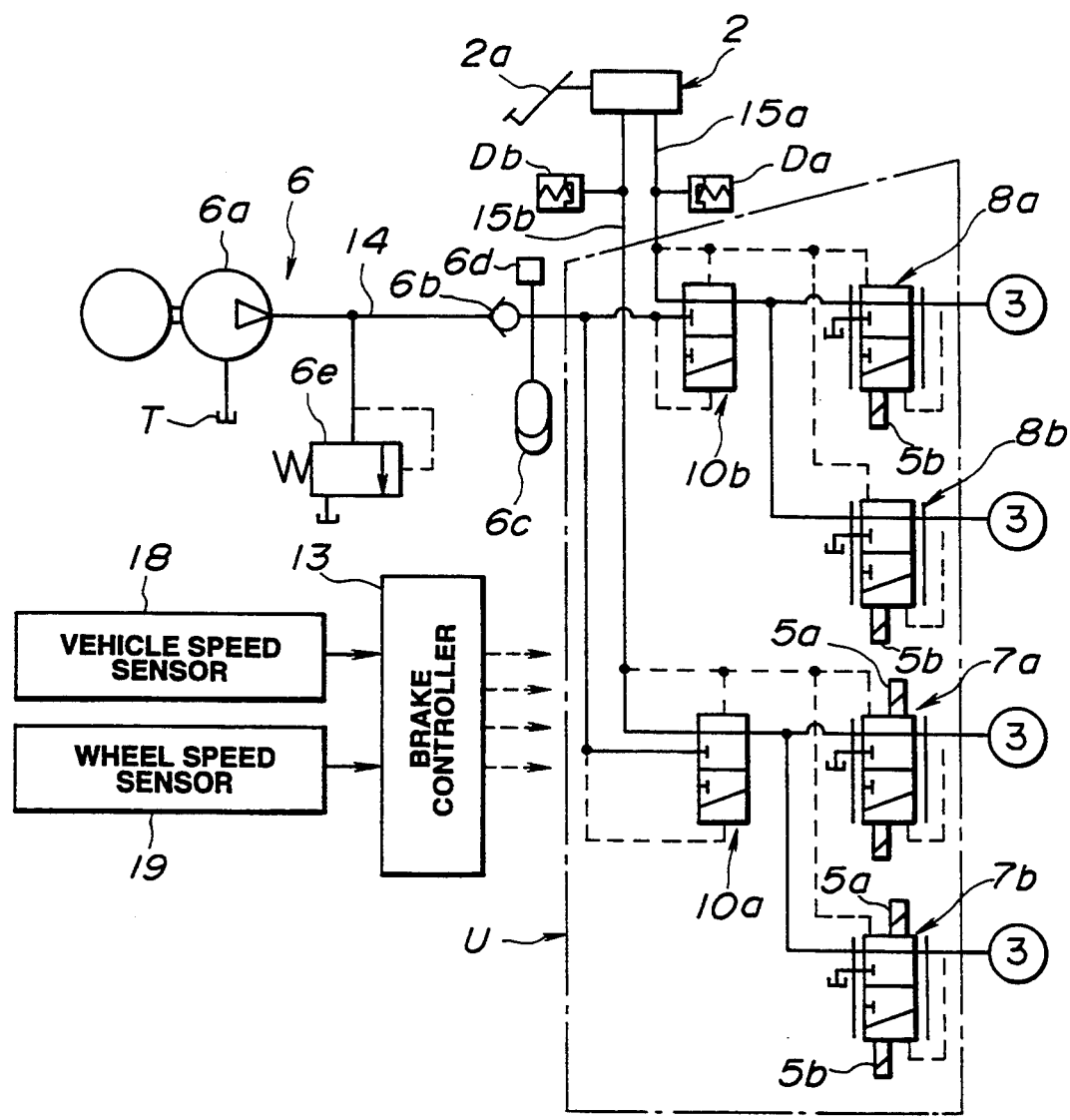
FIG. 7 is a schematic system diagram illustrating a brake fluid pressure control valve utilizing the fluid pressure control valve of the second embodiment.

Referring now to FIG. 7, the fluid pressure control valve of the second embodiment can be applied to a front-left wheel-cylinder pressure control valve 8a and a front-right wheel-cylinder pressure control valve 8b respectively employed in a brake fluid pressure control system equipped with at least an ABS. A pressure control operation of the control valve of the second embodiment is basically identical to an operation of a non-driven wheel side pressure control valve section (shown in FIG. 11B) of an integrated brake fluid pressure control valve unit U of the fourth embodiment which unit is connected to driven wheels and non-driven wheels and is utilized for a brake fluid pressure control system equipped with both the ABS and the TCS. The operation of the control valve of the second embodiment will be easily appreciated from a description of the control valve unit U of the fourth embodiment as hereinafter detailed.

Third embodiment

Figure 8:
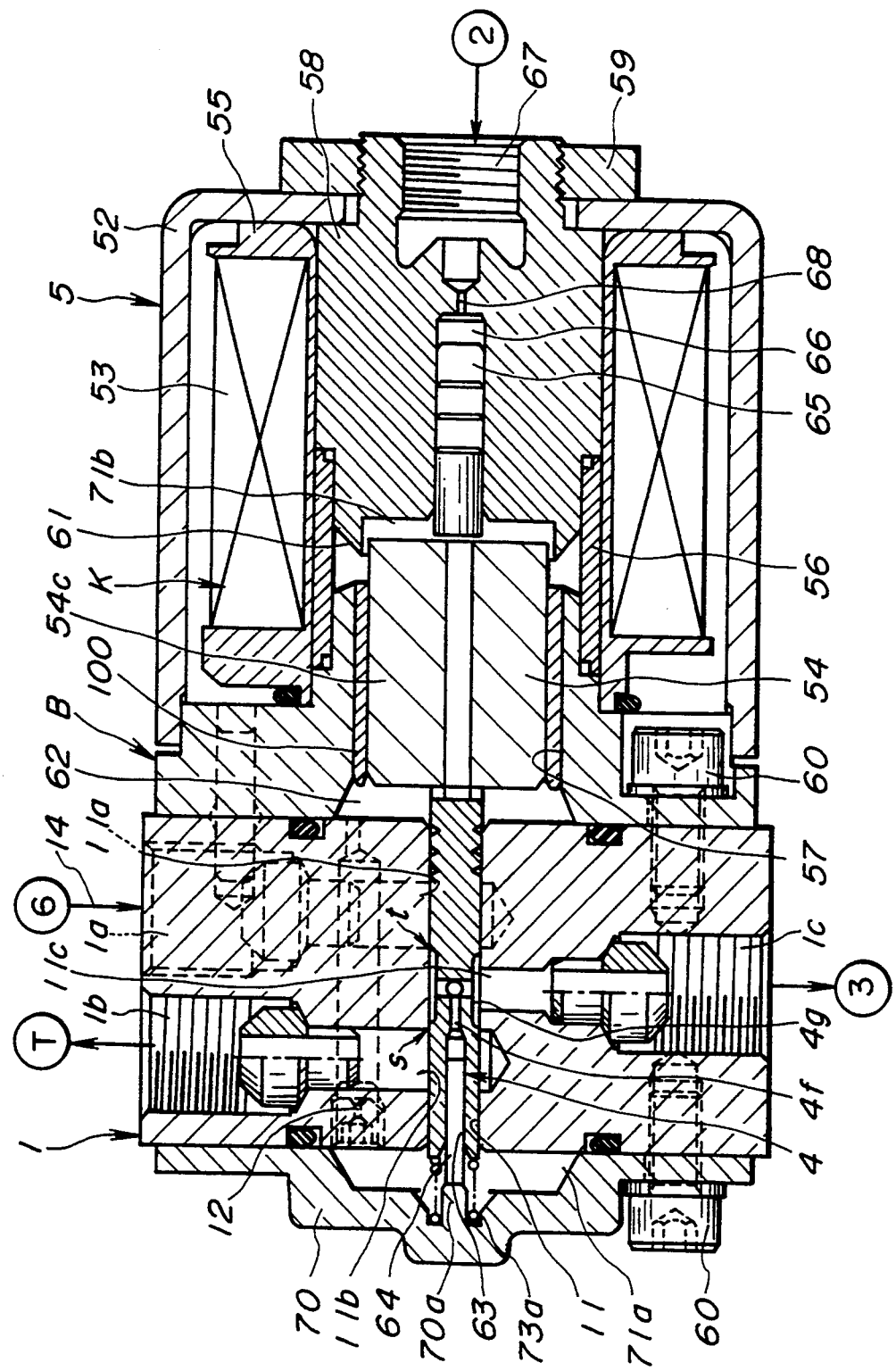
FIG. 8 is a cross-sectional view illustrating a third embodiment of a fluid pressure control valve according to the invention.

FIG. 8 shows a fluid pressure control valve of the third embodiment. The control valve of the third embodiment is different from that of the second embodiment, in that the center land 4c of the valve spool of the control valve of the second embodiment shown in FIG. 6 is replaced with an annular central groove 4g formed in an essentially center of the valve spool. For this reason, an inner diameter of each of the ports 11a and 11b is designed to be greater than that of the axial spool bore 11, while an inner diameter of the wheel-cylinder side port 11c is designed to be less than that of the bore 11. The respective ports 11a and 11b penetrate the spool bore 11 perpendicularly. On the other hand, the port 11c extends radially and outwardly from the spool bore 11. With the above port arrangement, the controlled fluid pressure in the port 11c acts uniformly on the outer periphery of the spool 4 to prevent undesirable radial force from acting on the spool. Low pressure introduced via the outlet port 1b to the drain port 11b acts uniformly onto the outer periphery of the valve spool, and in addition high pressure introduced via the inlet port 1a to the supply port 11a acts uniformly onto the outer periphery of the spool. Accordingly, such a port arrangement insures a smooth axial movement of the spool 4 without undesirable friction between the outer periphery of the spool and the inner wall of the spool bore 11. The previously-described control valves of the second and third embodiments have both the anti-skid brake control function and the booster function as hereinbelow detailed in accordance with a description of the brake fluid pressure control system of the fourth embodiment.

Fourth embodiment

Figure 9:
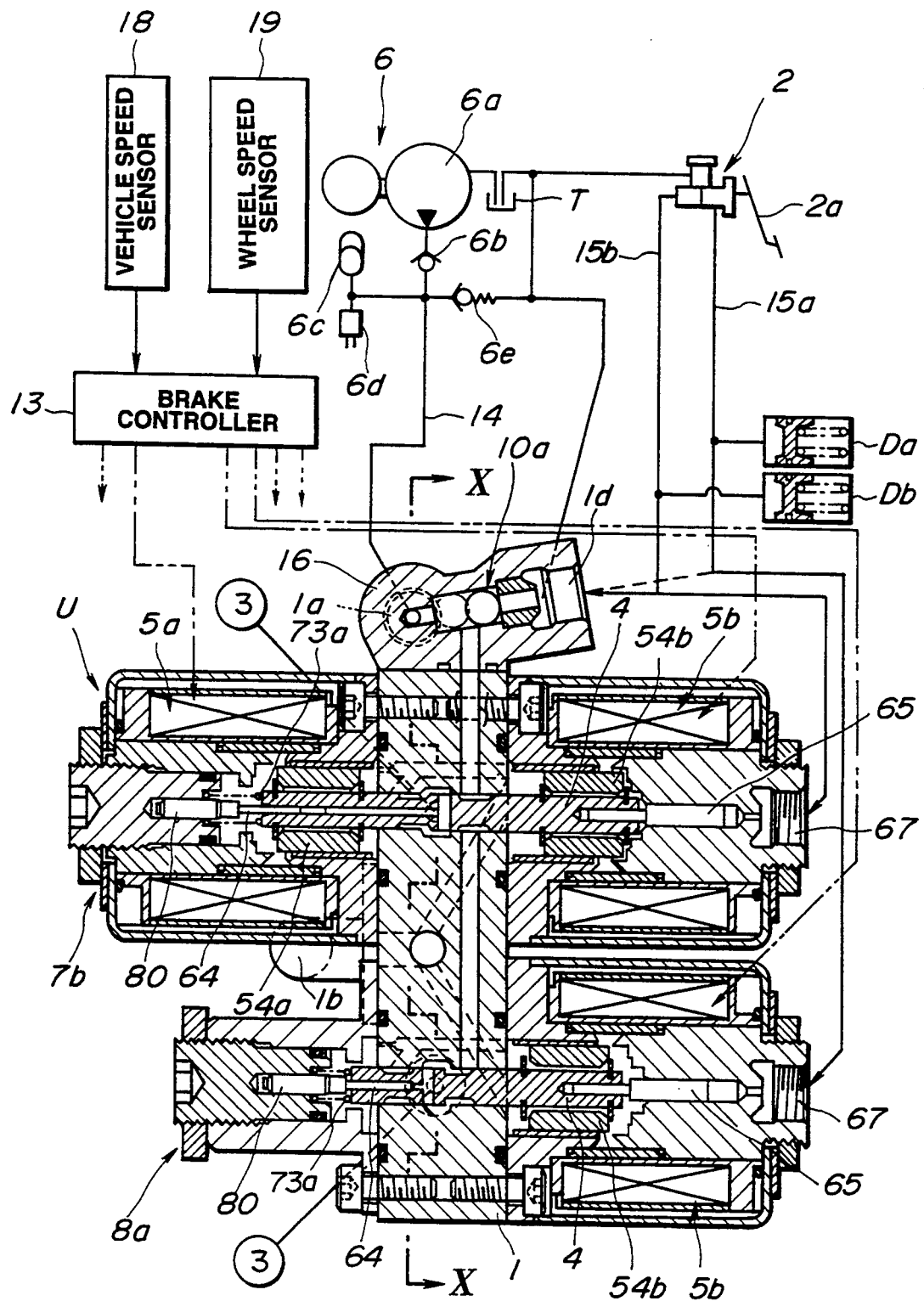
FIG. 9 is a schematic system diagram illustrating a brake fluid pressure control valve utilizing another fluid pressure control valve illustrated by a cross-section taken along the line IX—IX of FIG. 10.
Figure 10:
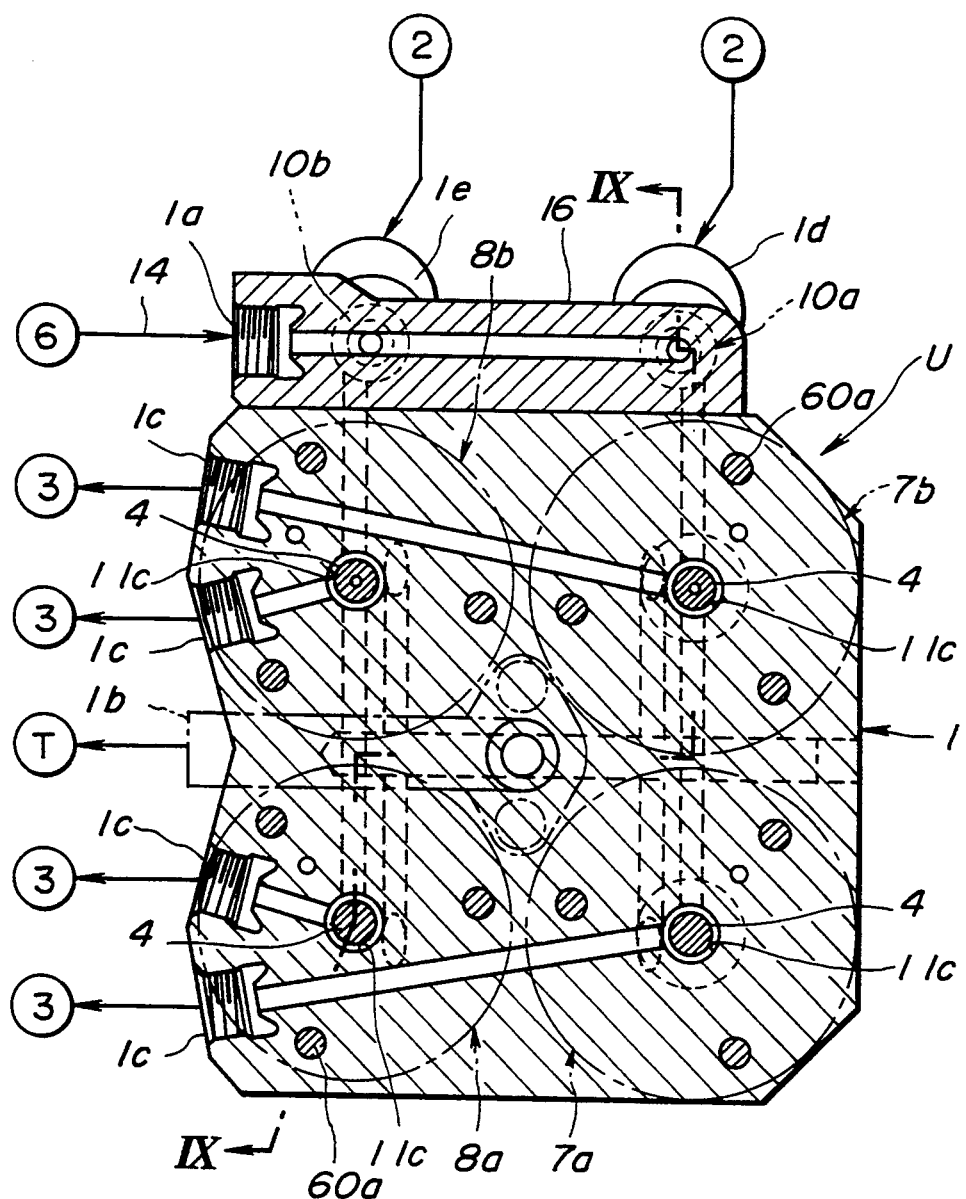
FIG. 10 is a cross-sectional view taken along the line X—X of FIG. 9.

Referring now to FIGS. 7, 9, 10, 11A and 11B, the brake fluid pressure control system of the fourth embodiment includes a tandem master cylinder 2, four wheel brake cylinders, an external hydraulic pressure source 6, a brake controller 13, and an integrated fluid pressure control valve unit U. As seen in FIG. 7, the brake system in the fourth embodiment does not require an additional hydraulic brake force booster 2b shown in FIG. 3, since a fluid pressure control valve itself functions as a compact hydraulic brake force booster. As best seen in FIG. 10, the integrated fluid pressure control valve unit U of the fourth embodiment is integrally formed with an upper-half valve section comprised of a rear-left driven wheel cylinder pressure control valve section 7a and a rear-right driven wheel cylinder pressure control valve section 7b, a lower-half valve section comprised of a front-left non-driven wheel cylinder pressure control valve section 8a and a front-right non-driven wheel cylinder pressure control valve section 8b, a rear wheel-cylinder side fail-safe valve section 10a, and a front wheel-cylinder side fail-safe valve section 10b, as a single control-valve unit. Returning to FIG. 7, the external hydraulic pressure source 6 comprises a fluid pressure pump 6a, an external hydraulic pressure supply line 14 arranged between the discharge port of the pump 6a and the inlet port 1a of the control valve unit U, a check valve 6b arranged in the line 14 for preventing back flow to the discharge port of the pump 6a, a pressure accumulator 6c accumulating high pressure caused by the pump 6a, a pressure switch 6d, and a relief valve 6e relieving excessive pressure in the working fluid discharged from the pump 6a. The fluid pressure generated by the pump 6a is usually set at higher level as compared with the master-cylinder pressure. A pair of pressure dampers Da and Db are fluidly disposed respectively in the main brake lines 15a and 15b, so as to avoid undesirable depression feeling of the pedal 2a. The control valves 7a and 7b are both identical in valve structure. Only the structure of the rear-right driven wheel cylinder side pressure control valve section 7b is herebelow described in accordance with the enlarged cross-section of FIG. 11A.

Figure 11A:
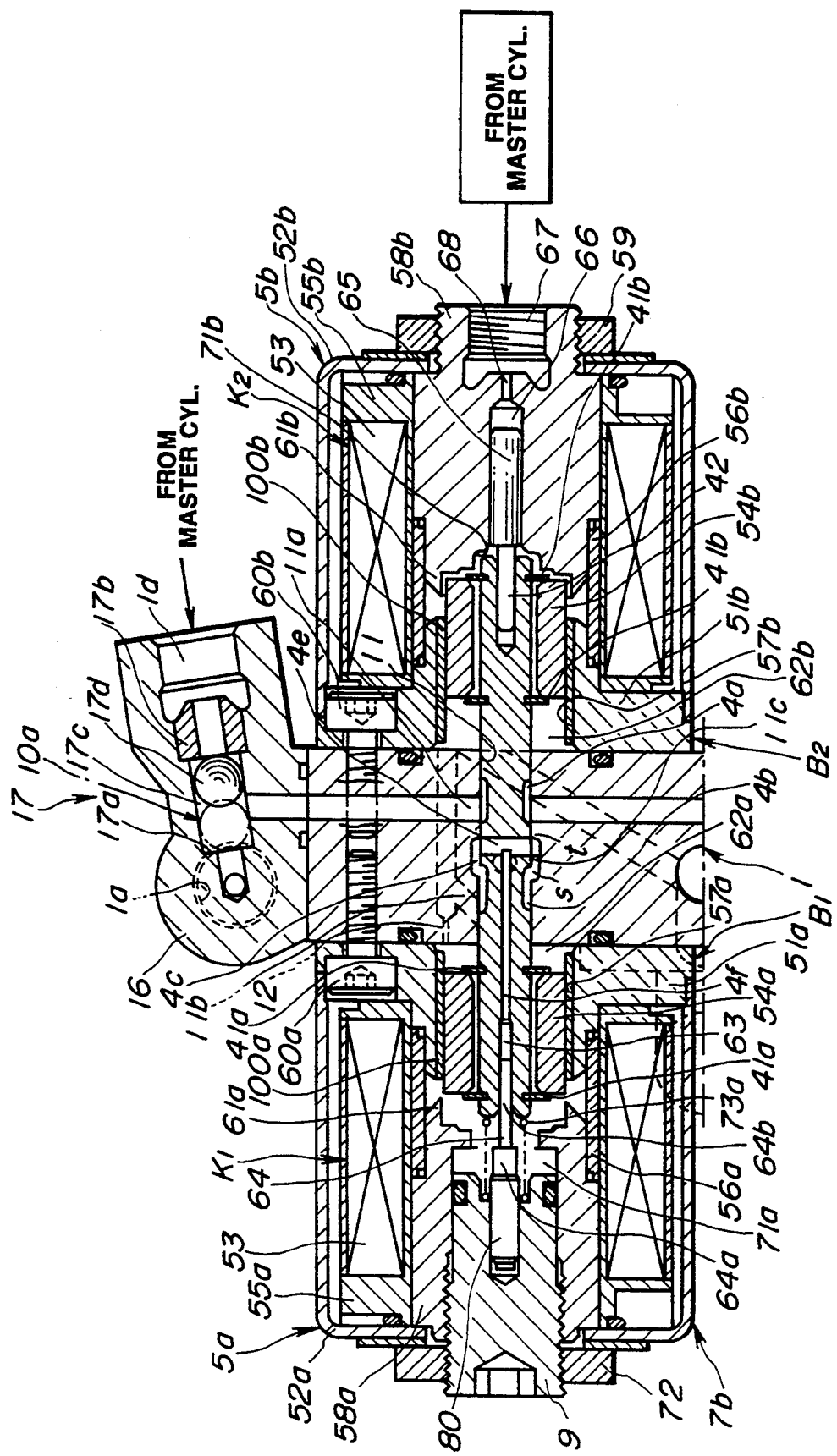

Referring to FIG. 11A, the rear-right driven wheel cylinder side pressure control valve section 7b includes a valve housing 1 defining a spool bore 11 therein, a hydraulic pressure supply port 11a receiving a fluid pressure from a brake fluid pressure source, a drain port 11b leading to a brake fluid reservoir T, and a controlled fluid pressure port 11c arranged substantially midway between the ports 11a and 11b and leading to the inlet-and-outlet port of the rear-right wheel cylinder. As seen in FIGS. 9 and 10, the supply port 11a is connected to an external hydraulic pressure supply line 14 of an external fluid pressure source 6 through a first inlet port 1a disposed in a fail-safe valve body 16 as described later. The drain port 11b into which atmospheric pressure is introduced, is connected through an outlet port 1b to the reservoir T. The port 11c is connected to the inlet-and-outlet port of the rear-right wheel cylinder 3 via a wheel-cylinder side connection port 1c. A valve spool 4 is slidably disposed in the spool bore 11. The spool 4 is formed with a right side annular communication groove 4a arranged for establishing a fluid communication between the two ports 11a and 11c, and a left side annular communication groove 4b arranged for establishing a fluid communication between the two ports 11b and 11c. An essentially central land 4c is defined between the above-noted two annular grooves 4a and 4b, in a manner which blocks the respective fluid communications between the ports 11a and 11c and between the ports 11b and 11c, in a centralized neutral position of the spool 4. As seen in FIG. 11A, the right end of the land 4c is cooperative with the port 11c to define a variable throttling orifice t, while the left end of the land 4c is cooperative with the port 11c to define a variable throttling orifice s. As previously described in the first embodiment, the pair of orifices t and s operates such that the opening degree of the orifice t is gradually increased in accordance with an increase in the leftward sliding movement of the spool 4, and the opening degree of the orifice s is gradually increased in accordance with an increase in the rightward sliding movement of the spool 4. Thus, the controlled fluid pressure created by the spool valve is continuously varied depending on a relative displacement of the spool 4 to its neutral position, in a manner so as to be increased according to the leftward sliding movement of the spool and to be decreased according to the rightward sliding movement of the spool. FIG. 11A illustrates a spool valve position slightly offsetting from the neutral position towards the right side.

The port 11c consists of an essentially annular groove surrounding the outer periphery of the spool 4. Therefore, the controlled fluid pressure in port 11c acts uniformly on the outer peripheral surface of the valve spool 4. This prevents undesirable radial force from acting on the spool 4. On the other hand, the supply port 11a and the drain port 11b respectively exposing to the annular grooves 4a and 4b. The inner diameter of each port 11a and 11b is designed to be smaller than that of the axial bore 11, with the result that atmospheric pressure introduced through the drain port 11b to the annular groove 4b acts uniformly onto the outer periphery of the valve spool and the master-cylinder pressure introduced through the supply port 11a to the annular groove 4a acts uniformly onto the outer periphery of the valve spool. As appreciated from the above, the port arrangement insures a smooth axial sliding movement of the valve spool 4 without undesirable friction owing to the radial force acting on the spool.

As shown in FIG. 11A, a pair of electromagnetic solenoids 5a and 5b are integrally attached to both ends of the valve housing 1. The right-hand side solenoid 5b is detachably secured onto the right end of the valve housing 1 by way of a nut 59, in order to cause the rightward axial sliding movement of the valve spool 4 and consequently to reduce the controlled fluid pressure in the port 11c is reduced. The left-hand side solenoid 5a is detachably secured onto the left end of the valve housing 1 by way of a nut 72, in order to cause the leftward axial sliding movement of the valve spool 4 and consequently to increase the controlled fluid pressure in the port 11c. As described later, the left-hand side solenoid 5a is referred to as a "TCS solenoid" because the solenoid 5a is operated during traction control, while the right-hand side solenoid 5b is referred to as an "ABS solenoid". The solenoid 5a is comprised of a solenoid body $B_1$, an essentially cylindrical coil portion $K_1$, and a solenoid plunger 54a. The solenoid body $B_1$ consists of a base 51a attached onto the left end of the valve housing 1, an intermediate cylindrical member 56a, and an attracting member 58a. The base 51a is comprised of a flange through which the base is detachably attached onto the left end of the valve housing 1 by means of bolts 60a and a relatively small-diameter boss-like portion onto which the intermediate cylindrical member 56a is fitted at one end thereof. The attracting member 58a is fitted to the other end of the intermediate member 56a. The coil portion $K_1$ is comprised of an exciting coil 53, a bobbin 55a winding the coil 53 thereon, and a protective coil casing 52a for the exciting coil. The bobbin 55a is made of non-magnetic material. The base 51a has an axial bore 57a defining a plunger chamber 62a which slidably accommodates the solenoid plunger 54a through a bushing 100a. The inner diameter of the plunger chamber 62a is designed to be greater than that of the spool bore 11. The plunger 54a consists of a cylindrical member defining therein an axially extending cylindrical hollow into which the left end of the valve spool 4 is inserted. After insertion of the left end of the spool into the solenoid plunger 54a, a pair of snap rings 41a, such as an E shaped ring, are fitted onto the outer periphery of the spool 4 so as to prevent relative axial movement of the plunger 54a to the valve spool 4 and to permit the plunger 54a to relatively rotate about the spool. The attracting member 58a, the coil casing 52a, the base 51a, and the bushing 100a, and the solenoid plunger 54a are made of magnetic material, in order to provide a path for a magnetic loop. The attracting member 58a is formed with a magnetic leakage edge 61a having a triangle in cross-section, so as to cause the solenoid to produce leftwardly attracting magnetic force for the spool 4. The attracting member 58a defines an axial bore 71a into which an adjuster plug 9 is screwed by way of a hexagonal wrench. The bore 71a is cooperative with the plug 9 to define a back chamber facing the left end of the plunger 54a. A stopper pin 80 is axially press-fitted into the plug 9, so as to operably support therearound a return spring 73a and to serve as a stopper for a reaction piston 64. Since the return spring 73a is disposed between the left end of the spool 4 and the plug 9 in its pre-compressed state, the bias of the spring 73a is transmitted directly to the spool 4, so that the spool 4 is constantly biased rightwards by way of the spring 73a. The initially set force of the spring 73a can be adjusted by way of rotation of the adjuster plug 9. On the other hand, the solenoid 5b is comprised of a solenoid body $B_2$, an essentially cylindrical coil portion $K_2$, and a solenoid plunger 54b. The solenoid body $B_2$ consists of a base 51b attached onto the right end of the valve housing 1, an intermediate cylindrical member 56b, and an attracting member 58b. The base 51b is comprised of a flange through which the base is detachably attached onto the right end of the valve housing 1 by means of bolts 60b and a relatively small-diameter boss-like portion onto which the intermediate cylindrical member 56b is fitted at one end thereof. The attracting member 58b is fitted to the other end of the intermediate member 56b. The coil portion $K_2$ is comprised of an exciting coil 53, a bobbin 55b winding the coil 53 thereon, and a protective coil casing 52b for the exciting coil. The bobbin 55b is made of non-magnetic material. The base 51b has an axial bore 57b defining a plunger chamber 62b which slidably accommodates the solenoid plunger 54b through a bushing 100b. The inner diameter of the plunger chamber 62b is designed to be greater than that of the spool bore 11. The plunger 54b consists of a cylindrical member defining therein an axially extending cylindrical hollow into which the right end of the valve spool 4 is inserted. After insertion of the right end of the spool into the solenoid plunger 54b, a pair of snap rings 41b, such as an E shaped ring, are fitted onto the outer periphery of the spool 4 so as to prevent relative axial movement of the plug 54b to the valve spool 4 and to permit the plunger 54b to relatively rotate about the spool. The attracting member 58b, the coil casing 52b, the base 51b, and the bushing 100b, and the solenoid plunger 54b are made of magnetic material, in order to provide a path for a magnetic loop. The attracting member 58b is formed with a magnetic leakage edge 61b having a triangle in cross-section, so as to cause the solenoid to produce rightwardly attracting magnetic force for the spool 4. The attracting member 58b defines a stepped axial bore 71b therein. The stepped bore 71b is comprised of a relatively large-diameter outermost bore section serving as a back chamber facing the right end of the plunger 54b, an intermediate bore section, and a relatively small-diameter innermost bore section into which a pilot piston 65 is slidably disposed. As seen in FIG. 11A, the reaction piston 64 of the spool valve of the fourth embodiment is comprised of a piston rod portion 64b which is slidably inserted into the small-diameter axial bore 63 of the valve spool, and a head portion 64a whose leftward movement is restricted by abutment against the stopper pin 80. The axial bore 63 communicates with the wheel-cylinder side port 11c through the axial communication passage 4f and the radial fluid passage 4e. A pilot piston 65 is slidably disposed in a center bore defined in the attracting member 58b. A pilot chamber 66 is defined by the right end surface of the pilot piston 65 and the inner wall of the central bore of the attracting member 58b. The pilot chamber 66 is communicated with the outlet port of the master cylinder 2 through a fixed orifice 68 and a pilot pressure inlet port 67. The fixed orifice 68 serves to prevent the sliding movement of the pilot piston 65 from being dampened and to ensure a smooth sliding movement of the piston 65 with a high responsiveness to the pilot pressure. The inlet port 67 receives the master-cylinder pressure as a pilot pressure. The left end of the pilot piston 65 is in contact with a stopper pin 42 press-fitted into the right end of the spool 4. As shown in the broken line of FIG. 11A, the drain port 11b is connected to the reservoir T via the right-hand side plunger chamber 62b. Additionally, the drain port 11b communicates with the left-hand side plunger chamber 62a via the fixed orifice 12, so as to prevent the axial sliding movement of the spool from being dampened.

In order to prevent undesirable magnetic field to cause, and to enhance magnetizing efficiency of the solenoid, it is preferable that a plurality of parts disposed in the vicinity of the above magnetized members such as the attracting members 58a and 58b, the coil casings 52a and 52b, the bases 51a and 51b, the bushings 100a and 100b and the plungers 54a and 54b are made of non-magnetic material. In the embodiment, the valve housing 1, the valve spool 4, the snap rings 41a and 41b, the reaction piston 64 and the pilot piston 65 are made of non-magnetic material, such as alumite, stainless steel, or the like. In the preferred embodiment, since a sufficient aperture is provided between the valve housing 1 and the respective solenoid plungers 54a and 54b to prevent a designated magnetic loop from being affected by undesirable magnetic field, the valve housing 1 may be formed of cast iron being magnetic material, if at least the valve spool is made of non-magnetic material. Likewise, supposing that the valve spool is made of non-magnetic material, the reaction piston 64 may be made of steel being magnetic material.

As shown in FIGS. 10 and 11A, the rear driven wheel side fail-safe valve 10a and the front non-driven wheel side fail-safe valve 10b is integrally formed in the single fail-safe valve body 16 attached onto the upper flat surface of the valve housing 1. As best seen in FIG. 10, the fail-safe valve body 16 includes a second inlet port 1d leading to the master cylinder 2 via the rear wheel side main brake line and a third inlet port 1e leading to the master cylinder 2 via the front wheel side main brake line, as well as the first inlet port 1a connected to the external hydraulic pressure supply line 14. As seen in FIG. 11A, the driven wheel side fail-safe valve 10a has a first valve seat portion 17a communicating with the external fluid pressure supply line 14 via the first inlet port 1a and a second valve seat portion 17b communicating with the rear-wheel side main brake line via the second inlet port 1d, while the non-driven wheel side fail-safe valve 10b has a first valve seat portion 17a communicating with the external fluid pressure supply line 14 via the first inlet port 1a and a second valve seat portion 17b communicating with the front-wheel side main brake line via the third inlet port 1e. Each of the fail-safe valve sections 10a and 10b includes an essentially cylindrical valve chamber 17c and a ball-type valve 17d operably disposed in the valve chamber 17c. The ball-type valve 17d is responsive to the pressure difference between an external fluid pressure introduced via the first valve seat 17a and a master-cylinder pressure introduced via the second valve seat 17b, in such a manner as to transmit only a higher one of the two hydraulic pressures into the pressure supply port 11a. The valve chamber 17c is inclined slightly in a manner that the first valve seat 17a is located at a lower level than the second valve seat 17b. As a consequence, the respective fail-safe valve 10a and 10b is designed that the ball-type valve 17d is brought in contact with the first valve seat 17a by way of its dead-load, in the absence of the pressure difference. Under such a condition wherein the pressure difference is zero, only the master-cylinder pressure is supplied via the fail-safe valve 10a to the supply port 11a. The structure of the non-driven wheel side fail-safe valve 10b is identical to that of the previously-noted driven wheel side fail-safe valve 10a.

The control valves 8a and 8b used for the front brake system are both identical in valve structure. Only the structure of the front-left non-driven wheel cylinder side pressure control valve section 8a is herebelow described in accordance with the enlarged cross-section of FIG. 11B. As appreciated from FIG. 11B, the valve structure of the front-left non-driven wheel side pressure control valve section 8a is basically similar to that of the previously noted rear-right driven wheel cylinder side pressure control valve section 7b illustrated in FIG. 11A, except that the TCS solenoid 5a is not provided in the control valve section 8a. As clearly seen in FIG. 9, the total length of the front wheel side control valve section 8a and the overall length of the spool of the valve section 8a without the TCS solenoid plunger 54a are necessarily shorter than those of the rear wheel side control valve section 7b with the TCS solenoid plunger 54a. In addition to the above, the control valve 8a is different from the control valve 7b, in that the attracting member 58a and the solenoid body $B_1$ are replaced with a flanged cylindrical member 90. The cylindrical member 90 is firmly secured to the left side of the valve housing 1 at the flanged end thereof by means of bolts 60a. An adjuster plug 9 is screwed into the outwardly projecting end of the member 90 in a fluid-tight fashion.

As appreciated from FIGS. 13A, 13B and 14, a dither current which oscillates according to a predetermined duty-cycle is constantly applied to the TCS solenoid 5a and the ABS solenoid in the respective driven-wheel side control valve 7a and 7b, and constantly applied to the ABS solenoid in the respective non-driven wheel side control valve 8a and 8b, and thus the solenoid plungers 54a and 54b slightly oscillate. Such microvibration of the solenoid plunger is transmitted via the snap rings 41a and 41b to the valve spool 4. This microvibration prevents undesirable hysteresis of the controlled fluid pressure owing to sliding resistance of the valve spool 4 and enhances a responsiveness of the control valve. Upon application of the dither current to the solenoid, the fluid pressure characteristics of a wheel-cylinder pressure versus a master-cylinder pressure exhibits slight positive and negative pressure fluctuations with respect to a usual fluid pressure characteristic shown by the broken line of FIG. 14. As seen in FIGS. 13A and 13B, in the driven-wheel side control valves 7a and 7b, a dither current applied to the ABS solenoid is conditioned in reverse phase to a dither current applied to the TCS solenoid, in order to suppress an undesirable axial displacement of the spool 4 owing to the dither current applied to the solenoids 5a and 5b. Moreover, it is advantageous that the two plungers 54a and 54b are disposed with a relatively high degree of freedom to permit a rotational movement of the plunger 54a relative to the spool 4 and a rotational movement of the plunger 54b relative to the spool 4 and consequently to enhance micro-vibration of each solenoid plunger.

The fluid pressure control valve unit U of the fourth embodiment operates as follows.

When the brakes are released, i.e., the brake pedal 2a is not depressed, the master-cylinder pressure becomes zero. Under this condition, the valve spool 4 of each control valve 7a, 7b, 8a and 8b is held in its rightmost position as shown in FIG. 11A. As a result, the controlled fluid pressure becomes zero, because of a fully opened orifice s. Thus, the wheel-cylinder pressure is held zero.

When the brakes are applied, i.e., the brake pedal 2a is depressed, the master-cylinder pressure is increased in response to an increase in depression of the pedal. During usual braking, the solenoids 5a and 5b are both deactivated, since the ABS and the TCS are held in-operative. In addition, the pump 6a is not driven under the in-operative condition of the TCS, and as a result the fail-safe valves 10a and 10b are both held in their initial valve positions as seen in FIG. 7. In each of the control valve sections 7a, 7b, 8a and 8b, the master-cylinder pressure is applied to the pilot piston 65 through the pilot-pressure inlet port 67, the orifice 68 and the pilot chamber 66. As shown in FIG. 11B, the pilot piston 65 is pushed towards the left. As a result, the valve spool 4 slides leftwards against the bias of the spring 73a and thus the orifice t is opened. Thus, the controlled fluid pressure in the port 11c is increased, with the result that the wheel cylinder pressure in each road wheel becomes increased. On the other hand, the reaction piston 64 receives the controlled pressure in the port 11c at the right end thereof, with the result that the reaction piston 64 moves leftwards. Upon the leftward sliding movement of the reaction piston 64 is restricted by way of the stationary stopper pin 80, reaction is applied to the valve spool 4, thereby resulting in a rightward sliding movement of the spool 4. As a consequence, the valve spool is held in a position at which the leftward pushing force caused by the pilot piston 65 is balanced to the sum of the rightward biasing force created by the spring 73a and the reaction of the reaction piston 64. Note that a pressure-receiving area of the pilot piston 65 employed in the respective control valve of the first, second, third and fourth embodiments is designed to be greater than that of the reaction piston 64. Under the above balanced state, since the product of the controlled fluid pressure in the port 11c and the pressure-receiving area of the reaction piston 64 is in proportion to the product of the master-cylinder pressure and the pressure-receiving area of the pilot piston 65, the ratio of the area of the pilot piston 65 to the area of the reaction piston 64 is necessarily equivalent to the ratio of the controlled fluid pressure in the port 11c to the incoming master-cylinder pressure. Accordingly, as compared with the master-cylinder pressure, the controlled fluid pressure in the port 11c becomes multiplied by a predetermined amplification such as "9", due to the ratio of the pressure-receiving area of the pilot piston 65 to the pressure-receiving area of the reaction piston 64. In such a control valve structure, the wheel-cylinder pressure can be increased with a high pressure gradient in accordance with an increase in the master-cylinder pressure, as appreciated from a wheel-cylinder pressure versus master-cylinder pressure characteristic indicated by BOOSTER of FIG. 12. That is, the control valve itself can function as a compact hydraulic brake force booster. As appreciated from the above, the respective control valves of the second, third, and fourth embodiments can easily produce high braking force.

Alternatively, when the ABS employed in the controller 13 determines skidding of the road wheel owing to an excessive braking force above frictional force between the tire and the road surface during quick braking or during braking on a low frictional road, for example snow or icy roads, the ABS is put into operation. During operation of the ABS, the ABS controls the magnitude of the exciting current applied to the ABS solenoid 5$b$, depending on the slip rate of each road wheel. On the other hand, the TCS is held in-operative, the pump 6$a$ is not driven and as a result only the master-cylinder pressure is introduced through the fail-safe valves 10$a$ and 10$b$ to the respective control valve sections 7$a$, 7$b$, 8$a$ and 8$b$. The ABS operates to permit normal application of the brakes by alternately reducing and intensifying the wheel-cylinder pressure of the skidding road wheel such that braking can held to just below the point at which a skid would start to develop. In the second, third and fourth embodiments, since the outer diameter of the valve spool 4 is designed to be smaller than that of the solenoid plungers 54$a$ and 54$b$, the control-valve arrangement ensures a relatively great attraction caused by the solenoid 5$a$ and 5$b$ and reduces oil leakage between the outer periphery of the spool and the inner periphery of the valve housing to a minimum. When the ABS solenoid 5$b$ is activated during operation of the ABS, the exciting coil 53 produces a magnetic loop in cooperation with the attracting member 58$b$, the coil casing 52$b$, the base 51$b$, pushing 100$b$, and the plunger 54$b$, with the result that the triangular magnetic leakage edge 61$b$ generates the attraction to attract the plunger 54$b$ towards the right side. The attraction is transmitted through the rightmost snap ring 41$b$ to the valve spool 4. As a consequence, the spool 4 is moved rightwards by way of activation of the ABS solenoid 5$b$. The valve spool becomes kept in a position wherein the leftward pushing force caused by the pilot piston 65 is balanced to the sum of the rightward biasing force of the spring 73$a$, the reaction of the reaction piston 64, and the attraction created by the ABS solenoid 5$b$. In this manner, the valve spool 4 is slightly returned to the right side owing to the attraction of the solenoid 5$b$, and thus the controlled fluid pressure is decreased to reduce braking force applied to the skidding road wheel. This reduces a skid of the road wheel. The brake controller 13 properly increases and decreases the magnitude of the exciting current applied to the ABS solenoid 5$b$ on the basis of comparison of the detected slip rate with a predetermined allowable slip rate. As shown in FIG. 12, a wheel-cylinder pressure versus master-cylinder pressure characteristic can be varied within a controlled pressure range indicated by ABS.

When the vehicle experiences acceleration slip of the driven wheels owing to excessive driving force above friction between the road surface and the driven wheels during quick depressing operation of the accelerator pedal, such as quick starting, quick acceleration, or the like, the TCS comes into operation so as to suppress excessive driving force exerted on the driven wheels and to enhance a controllability of the vehicle. During operation of the TCS, the TCS is responsive to the slip rate of each driven wheel to control the magnitude of the exciting current applied to the TCS solenoids 5$a$ respectively employed in the driven wheel side control valve sections 7$a$ and 7$b$. On the other hand, since the pump 6$a$ of the external fluid pressure source 6 is driven in response to an instruction from the TCS, the fluid pressure introduced via the first inlet ports 1$a$ exceeds the master-cylinder pressure introduced via the second and third inlet ports 1$d$ and 1$e$, whereby the fail-safe valves 10$a$ and 10$b$ are both switched from their initial positions to the other. Upon activation of the TCS solenoid 5$a$, the exciting coil 53 is cooperative to the attracting member 58$a$, the coil casing 52$a$, the base 51$a$, the bushing 100$a$ and the plunger 54$a$, so as to produce a desired magnetic loop. The triangular magnetic leakage edge 61$a$ generates the attraction to attract the plunger 54$a$ towards the left side. The attraction is transmitted through the leftmost snap ring 41$a$ to the valve spool 4. As a consequence, the spool 4 is moved leftwards by way of activation of the TCS solenoid 5$a$. The valve spool becomes kept in a position wherein the attraction created by the TCS solenoid 5$a$ is balanced to the sum of the rightward biasing force of the spring 73$a$ and the reaction of the reaction piston 64. In this manner, the valve spool 4 is slightly returned to the left side owing to the attraction of the TCS solenoid 5$a$, and thus the controlled fluid pressure is increased to build up braking force applied to the slipping road wheel. This reduces an acceleration-slip of the road wheel. The brake controller 13 properly controls the magnitude of the exciting current applied to the TCS solenoid 5$a$ on the basis of comparison of the detected slip rate with a predetermined allowable slip rate. As shown in FIG. 12, a wheel-cylinder pressure versus master-cylinder pressure characteristic can be varied within a controlled pressure range indicated by TCS. Assuming that the fluid pressure in the external fluid pressure supply line 14 becomes reduced owing to a failure in the fluid pump 6$a$ during operation of the TCS, the fluid pressure introduced via the first inlet port 1$a$ into the respective fail-safe valves 10$a$ and 10$b$ becomes less than the master-cylinder pressure introduced via the ports 1$d$ and 1$e$ into the fail-safe valve 10$a$ and 10$b$. In this case, each fail-safe valve 10$a$ and 10$b$ is returned to its initial position by way of dead-load of the built-in ball-type valve. As a result, the master-cylinder pressure is selected as a higher one of the two different fluid pressures introduced into the fail-safe valve. Under such a condition, if the brake pedal 2$a$ is depressed during operation of the TCS, only the master-cylinder pressure is introduced into the controlled fluid pressure ports 11$c$ of the four control valve sections 7$a$, 7$b$, 8$a$ and 8$b$, through the two inlet ports 1$d$ and 1$e$ and the two valve seats 17$b$ and the two valve chambers 17$c$, in that order. Accordingly, even though a value of the external fluid pressure is lowered to zero, the system insures a minimum guaranteed fluid pressure indicated in a guaranteed fluid pressure characteristic of FIG. 12.

As will be appreciated from the above, since each of the control valves of the second, third and fourth embodiments is constructed as a single valve unit with a compact hydraulic brake force booster device, such a valve structure ensures lightening of the brake fluid pressure control system. Furthermore, since the valve spool 4, the reaction piston 64, the pilot piston 65 and the solenoid plungers 54$a$ and 54$b$ are axially aligned with each other, and in addition spool 4, the reaction piston 64 and the pilot piston 65 are straight and cylindrical but not stepped, the pressure-sensing parts such as the valve spool, the reaction piston and the pilot piston can be compactly arranged in the cylindrical hollow defined in the solenoid, while preventing undesirable magnetic field to cause and enhancing magnetizing efficiency of the solenoid. Particularly, the integrated control valve unit U of the fourth embodiment may provide a considerably compact brake fluid pressure control system, since the unit U is comprised of a driven-wheel side control valve section having an ABS-valve function and a TCS-valve function as well as a hydraulic brake-force booster function, and a non-driven wheel side control valve section having an ABS-valve function as well as a hydraulic brake-force booster function. Moreover, since the outer diameter of each of the sliding parts such as the spool 4, the reaction piston 64 and the pilot piston 65 is designed to be smaller than that of the solenoid plunger, the above control valve structure can enhance a sealing performance of the valve without lowering the attraction of the solenoid. Therefore, a controlled fluid pressure output from the control valve may be set at a relatively high level.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A fluid pressure control valve, comprising:
   a valve housing slidably accommodating therein a valve spool;
   said valve spool responsive to an incoming fluid pressure introduced from a fluid pressure source into the pressure control valve, for producing a controlled fluid pressure output therefrom depending on an axial position of said valve spool;
   a biasing means disposed in said valve housing, for biasing said valve spool in a pressure buildup direction in which said controlled fluid pressure is increased;
   a reaction piston arranged to extend in an axial direction of said spool and slidably disposed in an axial bore of one end of said valve spool so that one projecting end of said reaction piston is in contact with a stopper attached to said valve housing and so that another end of said reaction piston receives said controlled fluid pressure; said reaction piston generating a reaction force acting on said valve spool by abutment between said one protecting end of said reaction piston and said stopper to apply said reaction force to said valve spool in a pressure reduction direction in which said controlled fluid pressure is reduced; and
   an electromagnetic solenoid including an axially slidable solenoid plunger having an outer diameter greater than said valve spool, said solenoid plunger engaging said valve spool to move said valve spool in said pressure reduction direction by attraction of said solenoid.

2. The fluid pressure control valve as set forth in claim 1, wherein said biasing means comprises a return spring which constantly biases said valve spool in said pressure buildup direction.

3. The fluid pressure control valve as set forth in claim 1, wherein said solenoid plunger is coaxially arranged to surround the outer periphery of said valve spool.

4. The fluid pressure control valve as set forth in claim 1, wherein said solenoid plunger is axially aligned with said valve spool so as to be in contact with another end of said valve spool.

5. The fluid pressure control valve as set forth in claim 1, wherein said control valve comprises a proportioning electromagnetic solenoid type pressure-control spool valve in which said controlled fluid pressure is increased in proportion to an increase in an exciting current applied to said proportioning electromagnetic solenoid.

6. The fluid pressure control valve as set forth in claim 1, wherein said reaction piston, said valve spool and said solenoid plunger are coaxially to each other.

* * * * *